United States Patent
Suzuki et al.

(10) Patent No.: US 12,379,571 B2
(45) Date of Patent: *Aug. 5, 2025

(54) OPTICAL MODULE

(71) Applicant: HAMAMATSU PHOTONICS K.K., Hamamatsu (JP)

(72) Inventors: Daiki Suzuki, Hamamatsu (JP); Yoshihisa Warashina, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 965 days.

This patent is subject to a terminal disclaimer.

(21) Appl. No.: 17/425,589

(22) PCT Filed: Jan. 22, 2020

(86) PCT No.: PCT/JP2020/002147
§ 371 (c)(1),
(2) Date: Jul. 23, 2021

(87) PCT Pub. No.: WO2020/158544
PCT Pub. Date: Aug. 6, 2020

(65) Prior Publication Data
US 2022/0099920 A1    Mar. 31, 2022

(30) Foreign Application Priority Data
Jan. 30, 2019  (JP) ................ 2019-014755

(51) Int. Cl.
*G02B 7/182*  (2021.01)
*G02B 26/08*  (2006.01)
(Continued)

(52) U.S. Cl.
CPC ........... *G02B 7/182* (2013.01); *G02B 26/085* (2013.01); *H01F 7/081* (2013.01); *G02B 26/10* (2013.01)

(58) Field of Classification Search
CPC ........ G02B 7/182; G02B 26/08; G02B 26/10; G02B 26/085; G02B 26/101; H01F 7/081;
(Continued)

(56) References Cited

U.S. PATENT DOCUMENTS 3,594,614 A   7/1971   Werner et al.
7,230,743 B2  6/2007   Matsuo et al.
(Continued)

FOREIGN PATENT DOCUMENTS

CN   101527493 A   9/2009
CN   101681019 A   3/2010
(Continued)

OTHER PUBLICATIONS

Guillamat, Pau, et al., "Control of active liquid crystals with a magnetic field," Proceedings of the National Academy of Science, vol. 113, No. 2, XP055529378, XP055793763, May 2, 2016, p. 5498-p. 5502.
(Continued)

*Primary Examiner* — Thomas K Pham
*Assistant Examiner* — Kuei-Jen L Edenfield
(74) *Attorney, Agent, or Firm* — Faegre Drinker Biddle & Reath LLP

(57) ABSTRACT

An optical module includes a mirror unit configured to have a movable mirror part, a magnet part configured to have upper and bottom surfaces and a side surface and generate a magnetic field acting on the movable mirror part, and a holding member configured to hold the magnet part. The magnet part has a Halbach structure including a first magnet having a force to act in a first direction and a second magnet having a force to act in a second direction. The holding member integrally holds the magnet part against a force acting on the first magnet in the first direction and a force
(Continued)

acting on the second magnet in the second direction. The mirror unit is supported on the upper surface by the holding member. A relaxation layer for relaxing stress from the magnet part is provided between the upper surface and the mirror unit.

16 Claims, 11 Drawing Sheets

(51) Int. Cl.
    *G02B 26/10*     (2006.01)
    *H01F 7/08*     (2006.01)

(58) Field of Classification Search
    CPC .............. B81B 3/0043; B81B 2201/04; B81B 2201/042; B81B 3/0051
    USPC ...... 359/199.4, 224.1, 439, 514, 225.1, 846, 359/237
    See application file for complete search history.

(56) References Cited

U.S. PATENT DOCUMENTS

| | | | |
|---|---|---|---|
| 9,664,897 B1 | 5/2017 | Hirshberg | |
| 11,385,455 B2 * | 7/2022 | Suzuki | H01F 7/0221 |
| 2005/0099671 A1 | 5/2005 | Matsuo et al. | |
| 2008/0042643 A1 | 2/2008 | Maier et al. | |
| 2008/0078184 A1 | 4/2008 | Saito et al. | |
| 2010/0046052 A1 * | 2/2010 | Mizoguchi | G02B 26/101 310/38 |
| 2010/0141366 A1 | 6/2010 | Sprague et al. | |
| 2010/0208322 A1 | 8/2010 | Borchers | |
| 2011/0169346 A1 | 7/2011 | Evers et al. | |
| 2012/0194891 A1 * | 8/2012 | Borchers | H02K 41/0354 359/200.7 |
| 2013/0003155 A1 | 1/2013 | Cugat et al. | |
| 2016/0105090 A1 | 4/2016 | Sadaharu et al. | |
| 2016/0357009 A1 * | 12/2016 | Shibayama | G02B 26/001 |
| 2017/0115580 A1 | 4/2017 | Zhu et al. | |
| 2018/0148314 A1 | 5/2018 | Takimoto et al. | |
| 2018/0157029 A1 | 6/2018 | Lemaire et al. | |
| 2020/0174247 A1 * | 6/2020 | Suzuki | G02B 7/198 |

FOREIGN PATENT DOCUMENTS

| | | |
|---|---|---|
| CN | 101877563 A | 11/2010 |
| CN | 102621689 A | 8/2012 |
| CN | 202405988 U | 8/2012 |
| CN | 102844263 A | 12/2012 |
| CN | 104898308 A | 9/2015 |
| CN | 105280324 A | 1/2016 |
| CN | 205159023 U | 4/2016 |
| CN | 105676447 A | 6/2016 |
| CN | 205355397 U | 6/2016 |
| CN | 105934698 A | 9/2016 |
| CN | 105947007 A | 9/2016 |
| CN | 105957707 A | 9/2016 |
| CN | 105992964 A | 10/2016 |
| CN | 205645427 U | 10/2016 |
| CN | 106876086 A | 6/2017 |
| DE | 3203192 A1 | 10/1983 |
| DE | 10021896 A1 | 11/2001 |
| EP | 1538473 A1 | 6/2005 |
| EP | 3163352 A1 | 5/2017 |
| JP | H08-334722 A | 12/1996 |
| JP | 2002-221686 A | 8/2002 |
| JP | 2004-020752 A | 1/2004 |
| JP | 2005-164859 A | 6/2005 |
| JP | 2007-312449 A | 11/2007 |
| JP | 4012843 B2 | 11/2007 |
| JP | 2011-125110 A | 6/2011 |
| JP | 2013-508785 A | 3/2013 |
| JP | 2013-097026 A | 5/2013 |
| JP | 2014-200140 A | 10/2014 |
| JP | 2015-227900 A | 12/2015 |
| JP | 2016-029880 A | 3/2016 |
| JP | 2017-060205 A | 3/2017 |
| WO | WO-02/074550 A1 | 9/2002 |
| WO | WO-2011/051620 A2 | 5/2011 |
| WO | WO 2014/109170 A1 | 7/2014 |
| WO | WO-2015/015664 A1 | 2/2015 |
| WO | WO-2016/002453 A1 | 1/2016 |
| WO | WO 2017/126289 | 7/2017 |
| WO | WO-2017/126290 A1 | 7/2017 |
| WO | WO 2018/159077 A1 | 9/2018 |

OTHER PUBLICATIONS

International Preliminary Report on Patentability mailed Feb. 20, 2020 for PCT/JP2018/029370.

International Preliminary Report on Patentability mailed Aug. 12, 2021 for PCT/JP2020/002147.

\* cited by examiner (a)

(b)

OPTICAL MODULE

TECHNICAL FIELD

The present disclosure relates to an optical module.

BACKGROUND ART

Patent Literature 1 discloses a planar-type actuator. This planar-type actuator includes a frame-shaped fixing part installed on a device substrate. On an inward side of the fixing part, a movable part is supported in a swingable manner with a torsion bar serving as a support beam therebetween. In addition, a frame-shaped yoke is installed around the fixing part, and a pair of magnetic field generation means disposed to face each other with the movable part sandwiched therebetween are installed on an inward side of this yoke. An oblique magnetic field of the magnetic field generation means is applied to a drive coil portion of the fixing part.

In this planar-type actuator, a magnetic field is generated when a current flows in a drive coil of the movable part, and a Lorentz force is generated due to interaction between this magnetic field and a static magnetic field of the magnetic field generation means. Accordingly, rotation forces in directions opposite to each other are generated in opposite side portions of the movable part parallel to an axial direction of the torsion bar, and the movable part swings to a position where the rotation forces and a restoring force of the torsion bar are balanced. Further, when an AC current flows in the drive coil, the movable part swings, and deflection scanning can be performed with a light beam using a reflection mirror.

CITATION LIST

Patent Literature

[Patent Literature 1] Japanese Unexamined Patent Publication No. 2014-200140

SUMMARY OF INVENTION

Technical Problem

In the planar-type actuator described in Patent Literature 1, the magnetic field generation means is firmly held by attaching a holding plate serving as a holding means for joining and holding the magnetic field generation means to an upper end surface of the magnetic field generation means using an adhesive or the like. Incidentally, as in this planar-type actuator, if a device substrate supporting the movable part and the magnetic field generation means are in a state of being in contact with each other, stress due to thermal expansion of the magnetic field generation means acts on the device substrate and the movable part. As a result, there is concern that unintentional inclination may occur in the device substrate and the movable part.

Here, an object of the present disclosure is to provide an optical module capable of curbing inclination of a mirror unit.

Solution to Problem

The following knowledge has been achieved in the research for solving the foregoing problems. That is, in an optical module as described above, it is conceivable to use a plurality of magnets in a Halbach array as a magnetic field generation means. In magnets in a Halbach array, a direction of thermal expansion thereof varies depending on the direction of magnetization. For this reason, complicated stress may act on members in contact with the magnets from the magnets. Therefore, particularly when magnets in a Halbach array are used, it is even more important to curb transmission of stress from the magnets to a mirror unit while curbing inclination of the mirror unit. The inventor has completed the present disclosure by conducting further research on the basis of the knowledge described above.

That is, according to the present disclosure, there is provided an optical module including a mirror unit having a movable mirror part including a coil, a magnet part having upper and bottom surfaces and a side surface extending from the upper surface to the bottom surface and configured to generate a magnetic field acting on the movable mirror part, and a holding member configured to hold the magnet part. The magnet part has a Halbach structure including a first magnet applied with a force in a first direction toward the bottom surface from the upper surface and a second magnet applied with a force in a second direction toward the upper surface from the bottom surface. The holding member integrally holds the magnet part against a force acting on the first magnet in the first direction and a force acting on the second magnet in the second direction. The mirror unit is supported by the holding member on the upper surface. A relaxation layer for relaxing stress from the magnet part is provided between the upper surface and the mirror unit.

In this optical module, the magnet part generating a magnetic field acting on the movable mirror part of the mirror unit has a Halbach structure including the first magnet and the second magnet. Such a magnet part is integrally held by the holding member against forces acting on the first magnet and the second magnet. The mirror unit is supported by this holding part on the upper surface of the magnet part. Further, the relaxation layer for relaxing stress from the magnet part is provided between the upper surface of the magnet part and the mirror unit. Therefore, in the optical module using a magnet part having such a Halbach structure, transmission of stress from the magnet part to the mirror unit is curbed, and inclination of the mirror unit is curbed.

In the optical module according to the present disclosure, the holding member may have a restriction part positioned on the upper surface to restrict movement of the magnet part in the second direction. The mirror unit may be supported by the restriction part. In this case, the magnet part may be integrally held by the holding member in a reliable manner. In addition, since the mirror unit is supported by the restriction part on the upper surface of the magnet part, it is easy to provide the relaxation layer between the upper surface and the mirror unit.

In the optical module according to the present disclosure, the restriction part may constitute at least a part of the relaxation layer. In this case, at least a part of the relaxation layer can be shared with the restriction part.

In the optical module according to the present disclosure, the restriction part may fill a space between the upper surface and the mirror unit and constitute the entirety of the relaxation layer. In this case, the restriction part and the entirety of the relaxation layer can be shared.

In the optical module according to the present disclosure, the restriction part may extend from a connection portion between the upper surface and the side surface toward an inward side of the upper surface and have an inner edge on the upper surface. The relaxation layer may be constituted of the restriction part and an air layer formed in a space defined by the inner edge. In this case, while movement of the magnet part is restricted by the restriction part, transmission of stress from the magnet part to the mirror unit can be reliably curbed by the air layer.

In the optical module according to the present disclosure, the holding member may have a side wall part supporting the side surface. The restriction part may be formed integrally with the side wall part. In this case, the constitution of the holding member including the restriction part is simplified.

In the optical module according to the present disclosure, the holding member may have a side wall part supporting the side surface. The restriction part may be provided on the upper surface such that the upper surface is covered when viewed in a direction intersecting the upper surface and have a contact part coining into contact with the upper surface. The contact part may be connected to the side wall part. In this case, since the contact part coining into contact with and covering the upper surface of the magnet part is connected to the side wall part, the magnet part can be more firmly held.

In the optical module according to the present disclosure, a thickness of the contact part in a direction intersecting the upper surface may be smaller than a thickness of the side wall part in a direction along the upper surface. In this case, since a distance between the mirror unit and the magnet part is reduced, a magnetic field of the magnet part can be efficiently utilized in the mirror unit. As a result, power consumption can be reduced.

In the optical module according to the present disclosure, the relaxation layer may include the contact part and an air layer formed on the upper surface and the contact part. In this case, while the magnet part is firmly held by the contact part, transmission of stress from the magnet part to the mirror unit can be reliably curbed by the air layer.

In the optical module according to the present disclosure, the mirror unit may be supported by the holding member at a position not overlapping the first magnet when viewed in a direction intersecting the upper surface. In this case, even if thermal expansion occurs in the second magnet part, the mirror unit is unlikely to incline.

In the optical module according to the present disclosure, the relaxation layer may include a portion having a Young's modulus lower than a Young's modulus of the magnet part. In this manner, transmission of stress from the magnet part to the mirror unit can be curbed by the relaxation layer including a portion having a Young's modulus lower than the Young's modulus of the magnet part.

Advantageous Effects of Invention

According to the present disclosure, it is possible to provide an optical module capable of curbing inclination of a mirror unit.

DESCRIPTION OF EMBODIMENTS

Hereinafter, embodiments will be described in detail with reference to the drawings. In each of the drawings, the same reference signs are applied to the same elements or corresponding elements, and duplicate description may be omitted.

First Embodiment

Figure 1:
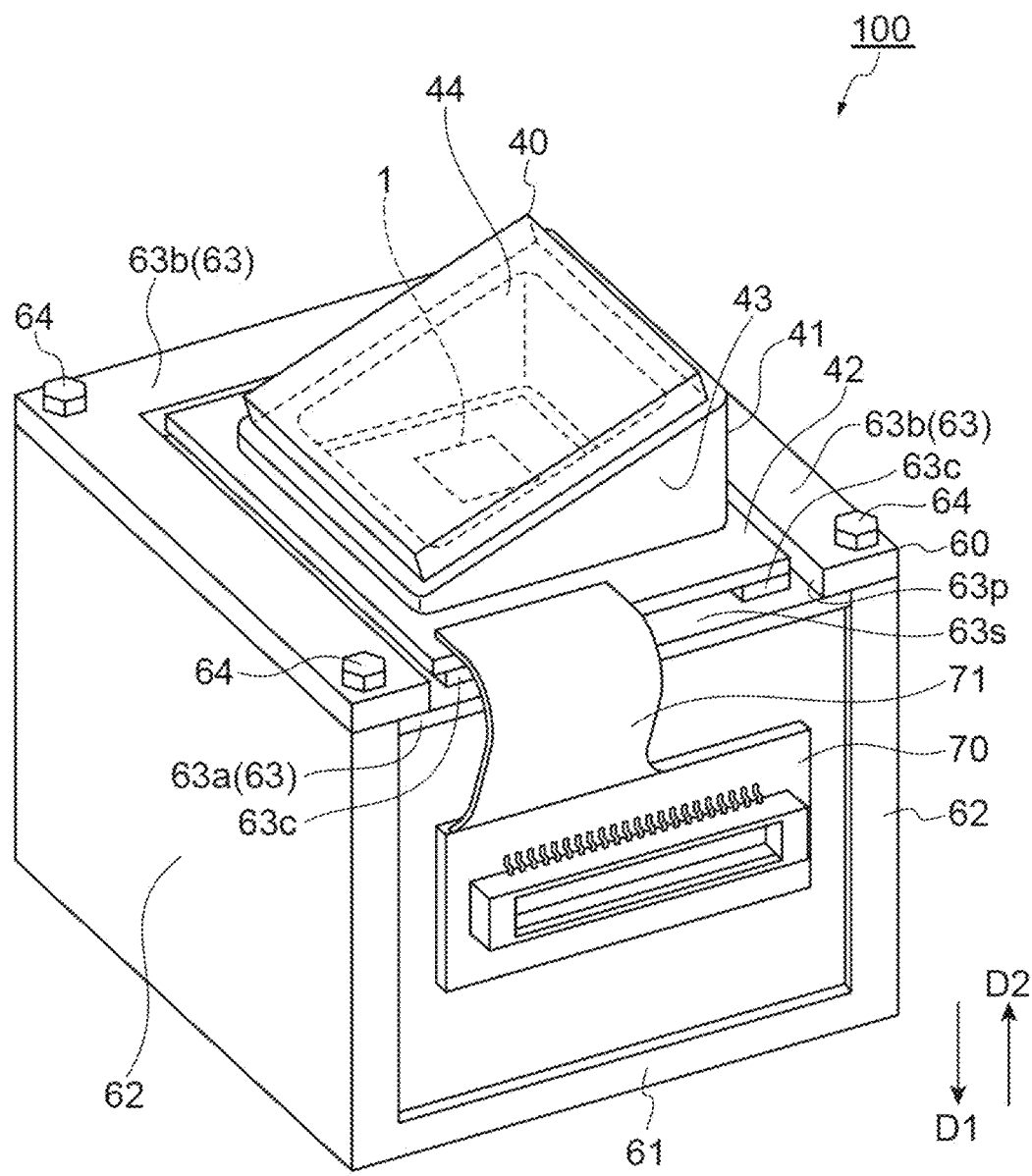
FIG. 1 is a perspective view illustrating an optical module according to the present embodiment.
Figure 2:
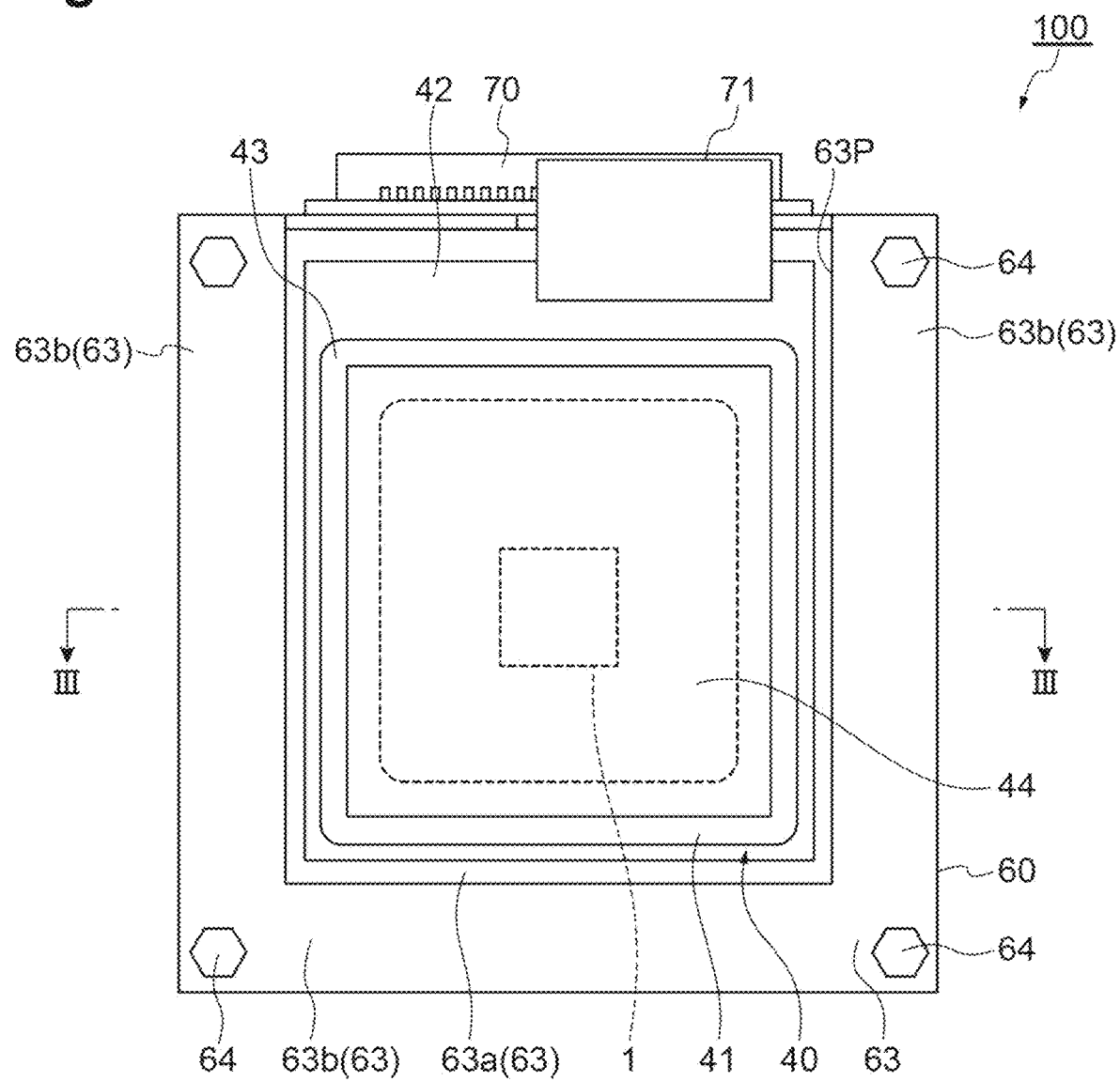
FIG. 2 is a plan view of the optical module illustrated in FIG. 1.
Figure 3:
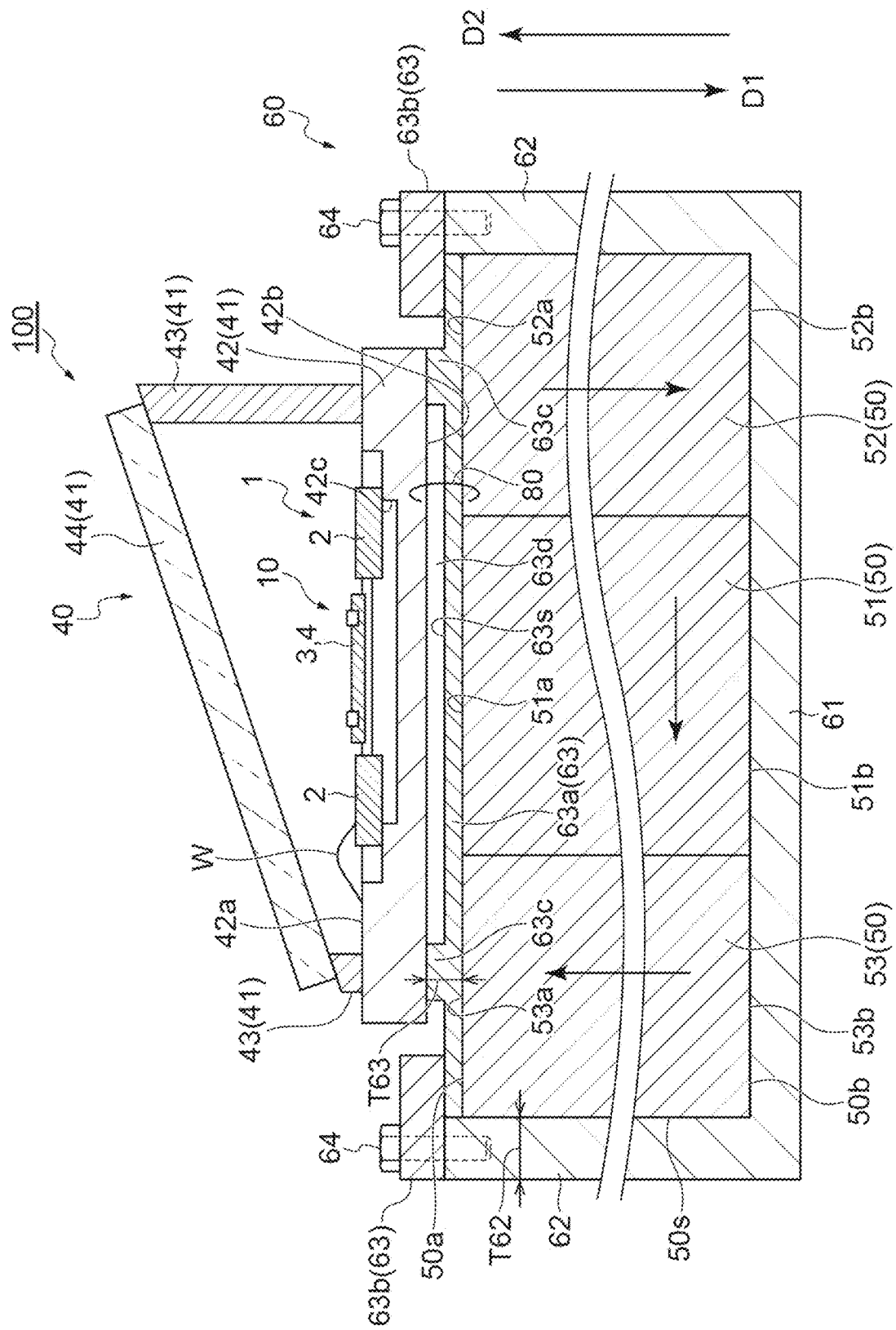
FIG. 3 is a schematic cross-sectional view along line III-III in FIG. 2.
Figure 5:
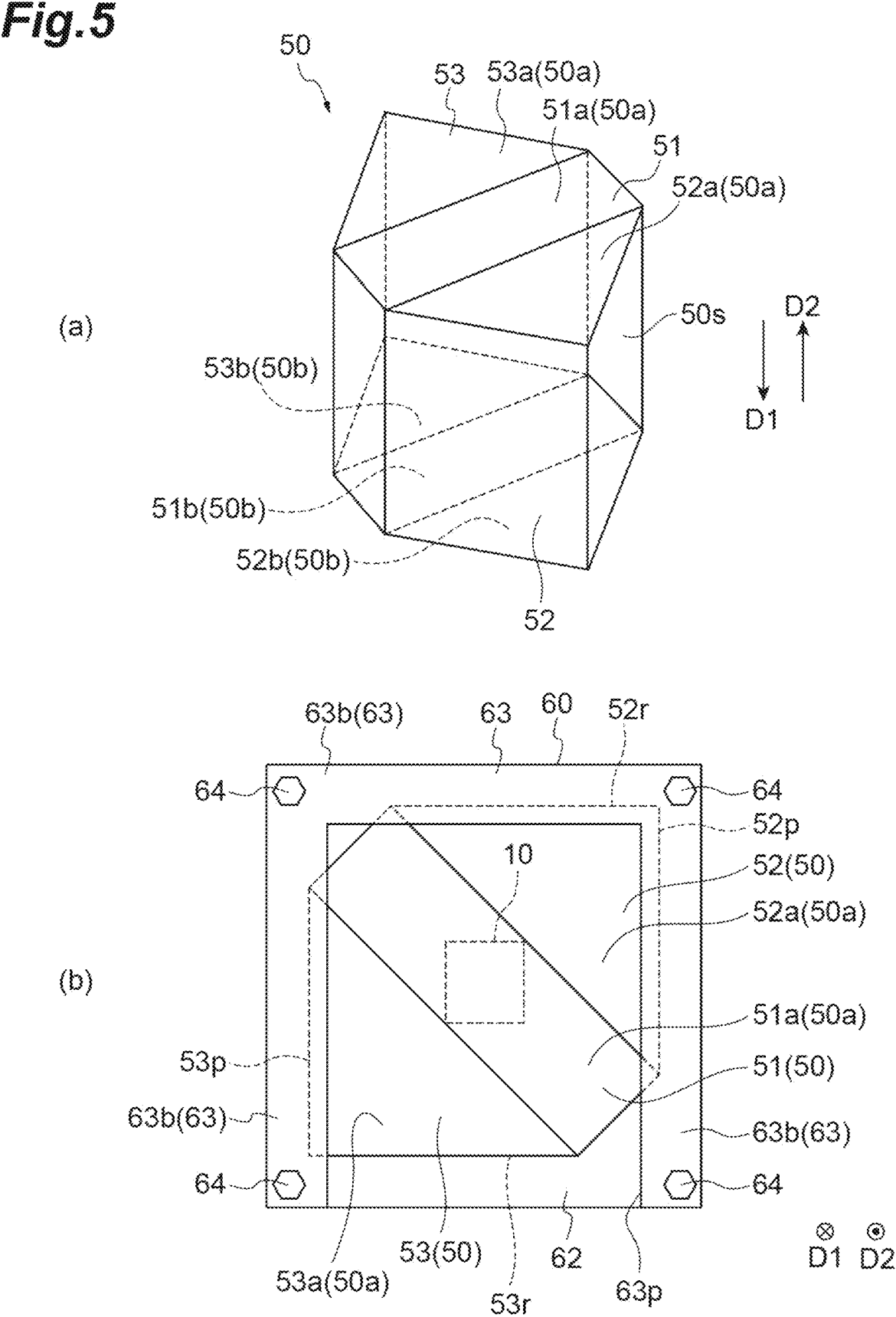
FIG. 5 is a view illustrating a magnet part and a package.

FIG. 1 is a perspective view illustrating an optical module according to the present embodiment. FIG. 2 is a plan view of the optical module illustrated in FIG. 1. FIG. 3 is a schematic cross-sectional view along line III-III in FIG. 2. FIG. 5 is a view illustrating a magnet part and a package. An optical module 100 illustrated in FIGS. 1 to 3 and 5 includes a mirror unit 40, a magnet part 50, and a package 60 (holding member). The mirror unit 40 has an electromagnetic driving-type micro electro mechanical systems (MEMS) mirror 1 and a mirror package 41 accommodating the MEMS mirror 1. The mirror package 41 has a base 42, a side wall 43, and a window member 44.

For example, the base 42 is formed of a nonmagnetic material such as aluminum nitride or aluminum oxide in a rectangular plate shape. For example, the side wall 43 is formed of a nonmagnetic material such as aluminum nitride or aluminum oxide in a rectangular tube shape. For example, the window member 44 is constituted by forming an anti-reflection film on both surfaces of a rectangular plate-shaped base material formed of a transparent material such as a glass.

The window member 44 is bonded to the side wall 43 using a bonding material such as a low melting-point glass, for example, such that one opening of the side wall 43 is sealed in an air-tight manner. The base 42 is bonded to the side wall 43 using a bonding material such as a low melting-point glass, for example, such that the other opening of the side wall 43 is sealed in an air-tight manner. In addition to bonding using a low melting-point glass, for example, bonding between the window member 44 and the side wall 43 and bonding between the side wall 43 and the base 42 may be sealing using a resin adhesive, a low-temperature solder (Sn/Pb or Sn/Cu-based), a low-temperature brazing material (Au/Sn alloy, Au/Ge alloy, or the like), a high-temperature brazing material (Ag-based or the like), projection welding, seam sealing welding, laser welding, electron beam welding, or the like. The window member 44 and one opening of the side wall 43 (that is, an opening sealed by the window member 44) face the base 42. The base 42 and the side wall 43 may be integrally formed of a nonmagnetic material.

For example, a support part 2 of the MEMS mirror 1 is attached to an inward surface 42a of the base 42 (a surface constituting an inner surface of the mirror package 41 on the surface of the base 42) using a resin. The magnet part 50 is accommodated in the package 60 such that it faces an outward surface 42b of the base 42 (a surface constituting an outer surface of the mirror package 41 on the surface of the base 42). The magnet part 50 faces a first movable part 3 of the MEMS mirror 1 with a part of the package 60 and the base 42 therebetween. The MEMS mirror 1 and the magnet part 50 will be described below in detail.

Figure 4:
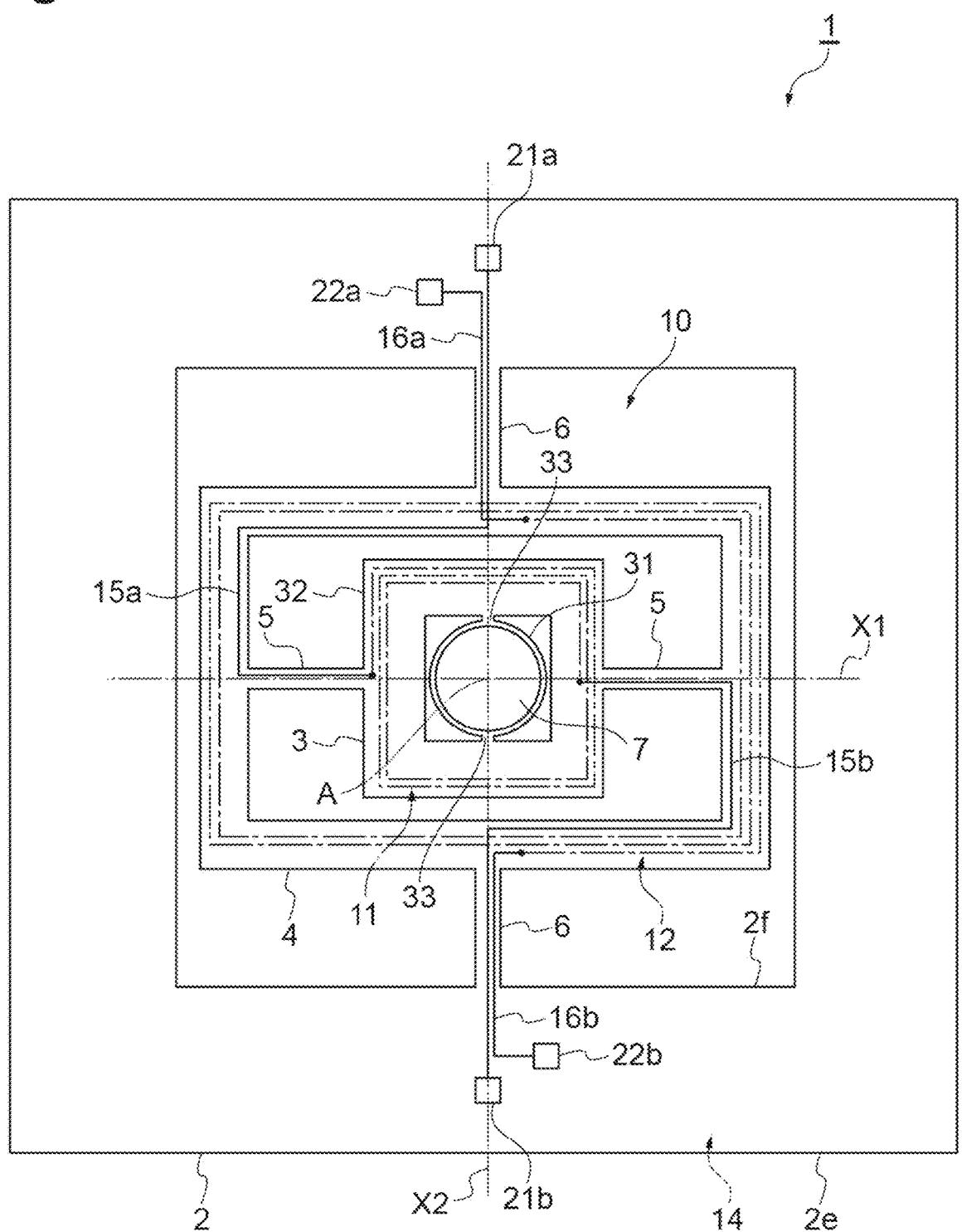
FIG. 4 is a plan view of a MEMS mirror illustrated in FIG. 1.

FIG. 4 is a plan view of the MEMS mirror illustrated in FIG. 1. As illustrated in FIG. 4, the MEMS mirror 1 has the support part 2 and a movable mirror part 10 including a first movable part (movable part) 3, a second movable part (movable part) 4, a pair of first joint parts 5, a pair of second joint parts 6, and a mirror 7. The support part 2, the first movable part 3, the second movable part 4, the pair of first joint parts 5, and the pair of second joint parts 6 are integrally formed of silicon, for example.

For example, the first movable part 3 is formed to have a rectangular plate shape. The second movable part 4 is formed to have a rectangular ring shape, for example, such that the first movable part 3 is surrounded with a gap therebetween when viewed in an optical axis direction A. The support part 2 is formed to have a rectangular frame shape, for example, such that the second movable part 4 is surrounded with a gap therebetween when viewed in the optical axis direction A. Namely, the support part 2 is formed to have a frame shape such that the first movable part 3 and the second movable part 4 are surrounded when viewed in the optical axis direction A.

The first movable part 3 is joined to the second movable part 4 with the pair of first joint parts 5 therebetween in a manner of being able to swing around a first axis X1. Namely, the first movable part 3 is supported by the support part 2 in a manner of being able to swing around the first axis X1. The first movable part 3 includes a first portion 31 and a second portion 32. The first portion 31 is formed to have a circular shape, for example, when viewed in the optical axis direction A. The second portion 32 is formed to have a rectangular ring shape, for example, when viewed in the optical axis direction A. The first portion 31 is surrounded by the second portion 32 when viewed in the optical axis direction A and is connected to the second portion 32 with a plurality of (here, two) connection portions 33 therebetween. Namely, a gap is formed between the first portion 31 and the second portion 32 except for the plurality of connection portions 33.

For example, the connection portions 33 are positioned at a central part between two sides, of inner edges of the rectangular-shaped second portion 32, intersecting a second axis X2. That is, here, the connection portions 33 are positioned on the second axis X2. The first portion 31 need only be connected to the second portion 32 in a direction along at least the second axis X2. The second movable part 4 is joined to the support part 2 with the pair of second joint parts 6 therebetween in a manner of being able to swing around the second axis X2. Namely, the second movable part 4 is supported by the support part 2 in a manner of being able to swing around the second axis X2. The first axis X1 and the second axis X2 are perpendicular to the optical axis direction A and intersect each other (here, orthogonal to each other). The first portion 31 may be formed to have a rectangular shape or a polygonal shape when viewed in the optical axis direction A. In addition, the first portion 31 may be formed to have a circular shape (for example, an oval shape) when viewed in the optical axis direction A. The second portion 32 may be formed to have a polygonal ring shape (having a number of vertices equal to or more than those of a pentagon) or a toric shape when viewed in the optical axis direction A.

The pair of first joint parts 5 are disposed on the first axis X1 such that the first movable part 3 is sandwiched therebetween in a gap between the second portion 32 of the first movable part 3 and the second movable part 4. Each of the first joint parts 5 functions as a torsion bar. The pair of second joint parts 6 are disposed on the second axis X2 such that the second movable part 4 is sandwiched therebetween in a gap between the second movable part 4 and the support part 2. Each of the second joint parts 6 functions as a torsion bar.

The mirror 7 is provided in the first portion 31 of the first movable part 3. The mirror 7 is formed on one surface of the first portion 31 (a surface on the window member 44 side) in a manner of including an intersection between the first axis X1 and the second axis X2. For example, the mirror 7 is formed of a metal material such as aluminum, an aluminum-based alloy, gold, or silver in a circular, oval, or rectangular film shape, and the center of the mirror 7 coincides with the intersection between the first axis X1 and the second axis X2 when viewed in the optical axis direction A. In this manner, since the mirror 7 is provided in the first portion 31 connected to the second portion 32 with the plurality of connection portions 33 therebetween, even if the first movable part 3 swings around the first axis X1 at a resonance frequency level, occurrence of deformation such as deflection in the mirror 7 is curbed.

Moreover, the MEMS mirror 1 has a first drive coil (coil) 11, a second drive coil (coil) 12, wirings 15a and 15b, wirings 16a and 16b, electrode pads 21a and 21b, and electrode pads 22a and 22b. In FIG. 2, for the sake of convenience of description, the first drive coil 11 and the second drive coil 12 are indicated by a one-dot dashed line, and the wirings 15a and 15b and the wirings 16a and 16b are indicated by a solid line.

The first drive coil 11 is provided in the second portion 32 of the first movable part 3. The first drive coil 11 is spirally (helically) wound a plurality of times in a region of the mirror 7 on an outward side (that is, the second portion 32) when viewed in the optical axis direction A. A magnetic field generated by the magnet part 50 acts on the first drive coil 11.

The first drive coil 11 is disposed inside a groove formed on a surface of the first movable part 3. Namely, the first drive coil 11 is embedded into the first movable part 3. One end of the first drive coil 11 is connected to the electrode pad 21a via the wiring 15a. The wiring 15a extends to the support part 2 from the first movable part 3 with one first joint part 5, the second movable part 4, and one second joint part 6 therebetween. For example, the wiring 15a and the electrode pad 21a are integrally formed of a metal material such as tungsten, aluminum, gold, silver, copper, or an aluminum-based alloy. The first drive coil 11 and the wiring 15a are connected to each other.

The other end of the first drive coil 11 is connected to the electrode pad 21b via the wiring 15b. The wiring 15b extends to the support part 2 from the first movable part 3 with the other first joint part 5, the second movable part 4, and the other second joint part 6 therebetween. For example, the wiring 15b and the electrode pad 21b are integrally formed of a metal material such as tungsten, aluminum, gold, silver, copper, or an aluminum-based alloy. The first drive coil 11 and the wiring 15b are connected to each other.

The second drive coil 12 is provided in the second movable part 4. The second drive coil 12 is spirally (helically) wound a plurality of times in the second movable part 4. A magnetic field generated by the magnet part 50 acts on the second drive coil 12. The second drive coil 12 is disposed inside a groove formed on a surface of the second movable part 4. Namely, the second drive coil 12 is embedded into the second movable part 4.

One end of the second drive coil 12 is connected to the electrode pad 22*a* via the wiring 16*a*. The wiring 16*a* extends to the support part 2 from the second movable part 4 with one second joint part 6 therebetween. For example, the wiring 16*a* and the electrode pad 22*a* are integrally formed of a metal material such as tungsten, aluminum, gold, silver, copper, or an aluminum-based alloy. The second drive coil 12 and the wiring 16*a* are connected to each other.

The other end of the second drive coil 12 is connected to the electrode pad 22*b* via the wiring 16*b*. The wiring 16*b* extends to the support part 2 from the second movable part 4 with the other second joint part 6 therebetween. For example, the wiring 16*b* and the electrode pad 22*b* are integrally formed of a metal material such as tungsten, aluminum, gold, silver, copper, or an aluminum-based alloy. The second drive coil 12 and the wiring 16*b* are connected to each other.

Examples of operation of the movable mirror part 10 in the foregoing MEMS mirror 1 will be given. Regarding a first example, a high-frequency driving current is applied to the first drive coil 11. At this time, since a magnetic field generated by the magnet part 50 acts on the first drive coil 11, a Lorentz force is generated in the first drive coil 11. Accordingly, for example, the first movable part 3 swings around the first axis X1 at a resonance frequency level.

In addition, a driving current having a uniform magnitude is applied to the second drive coil 12. At this time, since a magnetic field generated by the magnet part 50 acts on the second drive coil 12, a Lorentz force is generated in the second drive coil 12. Accordingly, for example, the second movable part 4 is turned around the second axis X2 in accordance with the magnitude of a driving current and is stopped in this state. Accordingly, according to the MEMS mirror 1, scanning can be performed with light from a predetermined light source while the light is reflected by the mirror 7. In this first example, the first movable part 3 swings at a resonance frequency and the second movable part 4 is statically used.

Regarding a second example, similar to operation of the first movable part 3 in the first example, the first movable part 3 swings in accordance with a resonance frequency when a high-frequency driving current is applied to the first drive coil 11, and the second movable part swings in accordance with a resonance frequency when a high-frequency driving current is applied to the second drive coil 12. In this manner, in this second example, both the first movable part 3 and the second movable part 4 swing at a resonance frequency.

Regarding a third example, similar to operation of the second movable part 4 in the first example, the first movable part 3 is turned around the first axis X1 in accordance with the magnitude of a driving current and stopped when a driving current having a uniform magnitude is applied to the first drive coil 11, and the second movable part 4 is turned around the second axis X2 in accordance with the magnitude of a driving current and stopped when a driving current having a uniform magnitude is applied to the second drive coil 12. In this manner, in this third example, both the first movable part 3 and the second movable part 4 are statically used.

Regarding a fourth example, for example, in a case in which the second movable part 4 is not provided or the like, when a high-frequency driving current is applied to the first drive coil 11, only the first movable part 3 swings in accordance with a resonance frequency. Moreover, regarding a fifth example, in a similar case, when a driving current having a uniform magnitude is applied to the first drive coil 11, the first movable part 3 is turned around the first axis X1 in accordance with the magnitude of a driving current and stopped. In the fourth example and the fifth example, only the first movable part 3 swings or statically used.

As illustrated in FIG. 3, a recessed part 42*c* is formed on the inward surface 42*a* of the base 42 in a manner of facing the first movable part 3 and the second movable part 4. The first movable part 3 and the second movable part 4 can swing by this recessed part 42*c* without interfering with the base 42.

Again, FIGS. 1 to 3 and 5 will be referred to. The magnet part 50 generates a magnetic field acting on the mirror unit 40 (MEMS mirror 1). The magnet part 50 has an upper surface 50*a*, a bottom surface 50*b* on a side opposite to the upper surface 50*a*, and a side surface 50*s* extending from the upper surface 50*a* to the bottom surface 50*b* and connecting the upper surface 50*a* and the bottom surface 50*b* to each other. The magnet part 50 exhibits a polygonal pillar shape. Here, the magnet part 50 has a hexagonal pillar shape. Therefore, the upper surface 50*a* and the bottom surface 50*b* have a hexagonal shape, and the side surface 50*s* have a hexagonal ring shape. The upper surface 50*a* and the bottom surface 50*b* are substantially parallel to each other.

The magnet part 50 is constituted of a plurality of combined magnets. Here, the magnet part 50 includes a first magnet 51 and a pair of second magnets 52 and 53 disposed in a manner of sandwiching the first magnet therebetween. The first magnet 51 has a polygonal pillar shape (here, a quadrangular pillar shape) extending such that it reaches the bottom surface 50*b* from the upper surface 50*a*. Therefore, in the first magnet 51, end surfaces thereof constitute areas of a part of the upper surface 50*a* and the bottom surface 50*b*. More specifically, the first magnet 51 includes an area 51*a* on the upper surface 50*a* and an area 51*b* on the bottom surface 50*b*.

Each of the second magnets 52 and 53 has a polygonal pillar shape (here, a triangular pillar shape) extending such that it reaches the bottom surface 50*b* from the upper surface 50*a*. Therefore, in the second magnets 52 and 53, end surfaces thereof constitute areas of a part of the upper surface 50*a* and the bottom surface 50*b*. More specifically, the second magnet 52 includes an area 52*a* on the upper surface 50*a* and an area 52*b* on the bottom surface 50*b*. In addition, the second magnet 53 includes an area 53*a* on the upper surface 50*a* and an area 53*b* on the bottom surface 50*b*. Here, the upper surface 50*a* is constituted of the areas 51*a*, 52*a*, and 53*a*, and the bottom surface 50*b* is constituted of the areas 51*b*, 52*b*, and 53*b*.

Here, each of the areas 52*a* and 53*a* of the second magnets 52 and 53 exhibits a triangular shape. Therefore, the area 52*a* of the second magnet 52 includes a first side portion 52*p* and a second side portion 52*r* facing the outward side of the magnet part 50. In addition, the area 53*a* of the second magnet 53 includes a third side portion 53*p* and a fourth side portion 53*r* facing the outward side of the magnet part 50.

The first magnet 51 and the second magnets 52 and 53 are arrayed such that magnetic poles thereof are in a Halbach array (that is, the magnet part 50 has a Halbach structure). Here, the second magnet 52 is disposed such that a first magnetic pole (for example, N pole) thereof is positioned on the bottom surface 50*b* side, and a second magnetic pole (for example, S pole) thereof is positioned on the upper surface 50*a* side. The second magnet 53 is disposed in a direction opposite to the second magnet 52. That is, the second magnet 53 is disposed such that the first magnetic pole thereof is positioned on the upper surface 50a side, and the second magnetic pole thereof is positioned on the bottom surface 50b side. On the other hand, the first magnet 51 is disposed such that the first magnetic pole is positioned on the second magnet 53 side, and the second magnetic pole is positioned on the second magnet 52 side.

The first magnet 51 and the second magnets 52 and 53 are disposed and combined such that the magnetic poles are arrayed as described above. For this reason, due to an attracting force and a repulsive force between the magnetic poles, a force acts on the first magnet 51 in a first direction D1 toward the bottom surface 50b from the upper surface 50a. On the other hand, a force acts on the second magnets 52 and 53 in a second direction D2 toward the upper surface 50a from the bottom surface 50b. Therefore, a constitution for integrally holding the magnet part 50 is required. In the present embodiment, the package 60 has a function thereof.

The package 60 accommodates the magnet part 50. The package 60 includes a bottom wall part 61, a side wall part 62, and a restriction part 63. The bottom wall part 61 and the side wall part 62 are formed integrally with each other. The restriction part 63 is formed separately from the bottom wall part 61 and the side wall part 62. The package 60 exhibits a parallelepiped shape in its entirety. The bottom wall part 61 exhibits a rectangular flat plate shape. The bottom wall part 61 comes into contact with the bottom surface 50b of the magnet part 50 and supports the bottom surface 50b. That is, the bottom wall part 61 supports the area 51b of the first magnet 51, the area 52b of the second magnet 52, and the area 53b of the second magnet 53.

The side wall part 62 stands along an outer edge of the bottom wall part 61. Therefore, here, the side wall part 62 has a rectangular ring shape. The side wall part 62 comes into contact with the side surface 50s of the magnet part 50 and supports the side surface 50s.

The restriction part 63 is provided on the upper surface 50a of the magnet part 50. The restriction part 63 comes into contact with the upper surface 50a of the magnet part 50 and supports the upper surface 50a. The restriction part 63 is disposed throughout the entirety of the upper surface 50a and supports the area 51a of the first magnet 51, the area 52a of the second magnet 52, and the area 53a of the second magnet 53. The restriction part 63 restricts movement of the magnet part 50 (for example, the second magnets 52 and 53) in the second direction D2. Accordingly, the package 60 in its entirety integrally holds the magnet part 50 against at least a force acting on the first magnet 51 in the first direction D1 and a force acting on the second magnets 52 and 53 in the second direction D2.

The restriction part 63 is constituted of a plurality of portions. Specifically, the restriction part 63 includes a contact part 63a and a lid part 63b. The contact part 63a in its entirety is formed to have approximately a flat plate shape. Here, the contact part 63a extends throughout the entirety of the upper surface 50a of the magnet part 50. Therefore, here, the contact part 63a is provided on the upper surface 50a such that the upper surface 50a is covered when viewed in a direction intersecting (orthogonal to) the upper surface 50a, and the contact part 63a comes into contact with the entirety of the upper surface 50a.

The lid part 63b is provided at an end part of the side wall part 62 on a side opposite to the bottom wall part 61. The lid part 63b is provided at a part of the end part of the side wall part 62 and is formed to have substantially a U-frame shape when viewed in a direction along the side wall part 62. The lid part 63b extends such that it protrudes on the upper surface 50a from the side wall part 62. In other words, the lid part 63b extends such that it lies across the upper surface 50a of the magnet part 50 from the side wall part 62. Moreover, in other words, the lid part 63b extends toward an inward side of the upper surface 50a from a connection portion between the side surface 50s and the upper surface 50a of the magnet part 50.

Accordingly, the lid part 63b covers three side portions on the hexagonal-shaped upper surface 50a when viewed in a direction intersecting the upper surface 50a (refer to FIG. 5(b)). Particularly, the lid part 63b covers a great part (for example, the entirety) of the first side portion 52p of the area 52a of the second magnet 52 and covers a great part of the second side portion 52r when viewed in a direction intersecting the upper surface 50a. Moreover, the lid part 63b covers a great part of the third side portion 53p of the area 53a of the second magnet 53 when viewed in a direction intersecting the upper surface 50a. However, the lid part 63b opens (does not cover) and exposes the fourth side portion 53r of the area 53a of the second magnet 53. An open portion 63p of this lid part 63b forms a lead-out part of the wiring part as described below. Here, the lid part 63b covers three of four corner parts in the area 51a of the first magnet 51.

At least a part (for example, three of four side portions) of a circumferential edge part of the contact part 63a is sandwiched between the lid part 63b and the upper surface 50a of the magnet part 50 described above. The contact part 63a comes into contact with both the upper surface 50a and the lid part 63b. For example, the lid part 63b is fastened to the side wall part 62 using a fastening member 64 such as a bolt in a state of coining into contact with the contact part 63a. Accordingly, the contact part 63a and the lid part 63b (that is, the restriction part 63) are fixed to the side wall part 62 and restrict movement of the magnet part 50 (for example, the second magnets 52 and 53) in the second direction D2. In this manner, here, although the contact part 63a is formed separately from the side wall part 62 of the package 60, the contact part 63a is connected to the side wall part 62 (reaches the side wall part 62).

In this manner, since the bottom wall part 61, the side wall part 62, and the restriction part 63 support the respective surfaces of the magnet part 50, the package 60 integrally holds the magnet part 50 in a mechanical manner. The package 60 in its entirety comes into contact with the upper surface 50a, the bottom surface 50b, and the side surface 50s which are continuous (connected to each other) in the magnet part 50. In addition, here, in the package 60, since the restriction part 63 is fastened to the side wall part 62 due to an external force from the fastening member 64, they are entirely integrated.

Here, the contact part 63a includes a surface 63s facing a side opposite to the magnet part 50, and support parts 63c protruding from the surface 63s. Here, a pair of support parts 63c are provided on the surface 63s. The support parts 63c are formed to have a long rectangular plate shape and extend substantially parallel to each other in a state of being separated from each other. The mirror unit 40 is placed on the support parts 63c and supported by the support parts 63c. That is, the mirror unit 40 is supported by the package 60 (particularly, the restriction part 63 including the support parts 63c) on the upper surface 50a. Here, the outward surface 42b of the base 42 of the mirror unit 40 faces the upper surface 50a side and comes into contact with the support parts 63c. For example, the base 42 is bonded to the support parts 63c using an adhesive resin or the like.

With such a support structure, a portion different from the mirror unit 40 and the magnet part 50 is interposed between the mirror unit 40 (the outward surface 42b) and the upper surface 50a of the magnet part 50. Here, a layer constituted of the contact part 63a of the restriction part 63 and an air layer 63d corresponding to the height of the support parts 63c is interposed between the mirror unit 40 and the upper surface 50a. In other words, the mirror unit 40 is supported on the upper surface 50a without directly coining into contact with the magnet part 50.

A layer interposed between the mirror unit 40 and the upper surface 50a functions as a relaxation layer for relaxing stress from the magnet part 50. That is, in the optical module 100, a relaxation layer 80 for relaxing stress of the magnet part 50 is provided between the mirror unit 40 and the upper surface 50a. More specifically, a portion interposed between the mirror unit 40 and the magnet part 50 functions as the relaxation layer 80 in a region in which the mirror unit 40 and the magnet part 50 overlap each other when viewed in the second direction D2 (a direction intersecting (orthogonal to) the upper surface 50a). For example, stress from the magnet part 50 is stress generated when the magnet part 50 expands due to heat. Here, on the upper surface 50a, the relaxation layer 80 is constituted of two layers, such as the solid contact part 63a and the hollow air layer 63d, disposed in order in a direction intersecting the upper surface 50a. In other words, the relaxation layer 80 includes the contact part 63a and the air layer 63d formed on the upper surface 50a and the contact part 63a.

Particularly, here, the support parts 63c of the contact part 63a are provided on the pair of second magnets 52 and 53 sandwiching the first magnet 51 therebetween, and the mirror unit 40 is supported by the support parts 63c. In addition, a thickness T63 of the contact part 63a (including the support parts 63c) in a direction intersecting (orthogonal to) the upper surface 50a is smaller than a thickness T62 of the side wall part 62 in a direction along the upper surface 50a. The thickness T63 of the contact part 63a indicates a distance from a bottom surface to a top surface of the contact part 63a in a region in which the mirror unit 40 and the contact part 63a overlap each other when viewed in the first direction D1 (a direction intersecting (orthogonal to) the upper surface 50a). Particularly, when the support parts 63c are provided in the contact part 63a, the thickness T63 of the contact part 63a indicates a distance from the bottom surface of the contact part 63a to the top surfaces of the support parts 63c in a region in which the mirror unit 40 and the contact part 63a overlap each other when viewed in the first direction D1. The bottom surface of the contact part 63a is a surface facing the magnet part 50 in the contact part 63a, and each of the top surfaces of the contact part 63a and the support parts 63c is a surface facing a side opposite to the magnet part 50.

The relaxation layer 80 is gas such as air or has a Young's modulus lower than that of the magnet part 50 when it is not gas. In the present embodiment, the relaxation layer 80 includes a portion (air layer 63d) which is gas such as air, and a portion (contact part 63a) having a Young's modulus lower than the Young's modulus of the magnet part 50. When the relaxation layer 80 includes a plurality of portions which are not gas (for example, a plurality of layers stacked on the upper surface 50a), the Young's modulus of at least one portion (one layer) need only be lower than the Young's modulus of the magnet part 50 in comparison to the Young's modulus of the magnet part 50 for each of the portions (layers).

Here, for example, portions of the package 60 excluding the restriction part 63 are integrally molded in a state of accommodating the magnet part 50 by insert molding. Specifically, in this example, portions of the package 60 excluding the restriction part 63 are integrally molded by introducing a resin into a mold while the first magnet 51 and the second magnets 52 and 53 are held such that they are not separated from each other after the magnet part 50 provided with the contact part 63a is disposed in the mold.

For example, a material of the package 60 may be a resin classified into super engineering plastic or engineering plastic. For example, polyphenylene sulfide (PPS), a liquid crystal polymer (LCP), polyether ether ketone (PEEK), or the like is adopted. Moreover, a material of the package 60 may be subjected to filler-reinforcement in order to improve mechanical strength or heat resistance. On the other hand, for example, a material of the magnet part 50 is a neodymium magnet, a samarium cobalt magnet, a ferrite magnet, or the like. For example, a material of the restriction part 63 constituting the relaxation layer 80 and a material of the magnet part 50 may be selected from the foregoing materials such that the relationship between the Young's moduli described above is satisfied.

The optical module 100 further includes a connector 70 and a wiring part 71 connected to the connector 70. The connector 70 is buried inside the side wall part 62 of the package 60. The wiring part 71 extends from the connector 70 and is connected to the optical module 100 (for example, the base 42) via the open portion 63p of the restriction part 63. For example, the wiring part 71 and the MEMS mirror 1 are electrically connected to each other through a wire W.

As described above, in the optical module 100, the magnet part 50 generating a magnetic field acting on the movable mirror part 10 of the mirror unit 40 has a Halbach structure including the first magnet 51 and the second magnets 52 and 53. Such a magnet part 50 is integrally held by the package 60 against a force acting on the first magnet 51 and the second magnets 52 and 53 (for example, a force generated due to interaction between magnetic forces). The mirror unit 40 is supported by this package 60 on the upper surface 50a of the magnet part 50. Further, the relaxation layer 80 for relaxing stress from the magnet part 50 is provided between the upper surface 50a of the magnet part 50 and the mirror unit 40. Therefore, in the optical module 100 using the magnet part 50 having such a Halbach structure, transmission of stress from the magnet part 50 to the mirror unit 40 is curbed, and inclination of the mirror unit 40 is curbed.

In addition, in the optical module 100, the package 60 has the restriction part 63 positioned on the upper surface 50a to restrict movement of the magnet part 50 in the second direction D2. Further, the mirror unit 40 is supported by the restriction part 63. For this reason, the magnet part 50 may be integrally held by the package 60 in a reliable manner. In addition, since the mirror unit 40 is supported by the restriction part 63 on the upper surface 50a of the magnet part 50, it is easy to provide the relaxation layer 80 between the upper surface 50a and the mirror unit 40.

Particularly, in the optical module 100, the support parts 63c project on the surface 63s of the contact part 63a of the restriction part 63, and the mirror unit 40 is supported by the support parts 63c. For this reason, the surface area of a contact surface for supporting the mirror unit 40 is reduced, and transmission of stress from the magnet part 50 to the mirror unit 40 is reliably curbed.

In addition, in the optical module 100, the restriction part 63 constitutes at least a part of the relaxation layer 80. For this reason, at least a part of the relaxation layer 80 can be shared with the restriction part 63.

Moreover, in the optical module 100, the Young's modulus of the relaxation layer 80 is lower than the Young's modulus of the magnet part 50. In this manner, due to the relaxation layer 80 having a Young's modulus lower than the Young's modulus of the magnet part 50, transmission of stress from the magnet part 50 to the mirror unit 40 can be curbed.

Here, in the optical module 100, the relaxation layer 80 includes two layers, such as the solid contact part 63a which comes into contact with the upper surface 50a such that the upper surface 50a is covered when viewed in a direction intersecting the upper surface 50a, and the air layer 63d which is formed in a space provided on the upper surface 50a and the contact part 63a. In this case, since the upper surface 50a of the magnet part 50 is covered with the contact part 63a coining into contact with the magnet part 50, the magnet part 50 is held more firmly. Furthermore, transmission of stress from the magnet part 50 to the mirror unit 40 is reliably curbed by the air layer 63d.

Particularly, in the optical module 100, the mirror unit 40 is supported by the support parts 63c provided on the pair of second magnets 52 and 53. In other words, a support structure for the mirror unit 40 is not interposed on the first magnet 51. Moreover, in other words, the mirror unit 40 is supported by the package 60 (the support parts 63c) at a position not overlapping the first magnet 51 when viewed in a direction intersecting (orthogonal to) the upper surface 50a. Accordingly, the following effects can be achieved.

That is, expansion directions of the second magnets 52 and 53 due to thermal expansion are the same as each other (an expansion direction of the first magnet 51 differs). Therefore, if the mirror unit 40 is supported by the support parts 63c on the second magnets 52 and 53, even if thermal expansion occurs in the second magnets 52 and 53, the mirror unit 40 is unlikely to incline. That is, the support structure for the mirror unit 40 may be disposed at any place but may be disposed at a position not overlapping the first magnet 51 when viewed in a direction intersecting (orthogonal to) the upper surface 50a.

In addition, in the optical module 100, the thickness T63 of the contact part 63a in a direction intersecting the upper surface 50a is smaller than the thickness T62 of the side wall part 62 in a direction along the upper surface 50a. For this reason, since a distance between the mirror unit 40 and the magnet part 50 is reduced, a magnetic field of the magnet part 50 can be efficiently utilized in the mirror unit 40. As a result, power consumption can be reduced.

Second Embodiment

Figure 6:
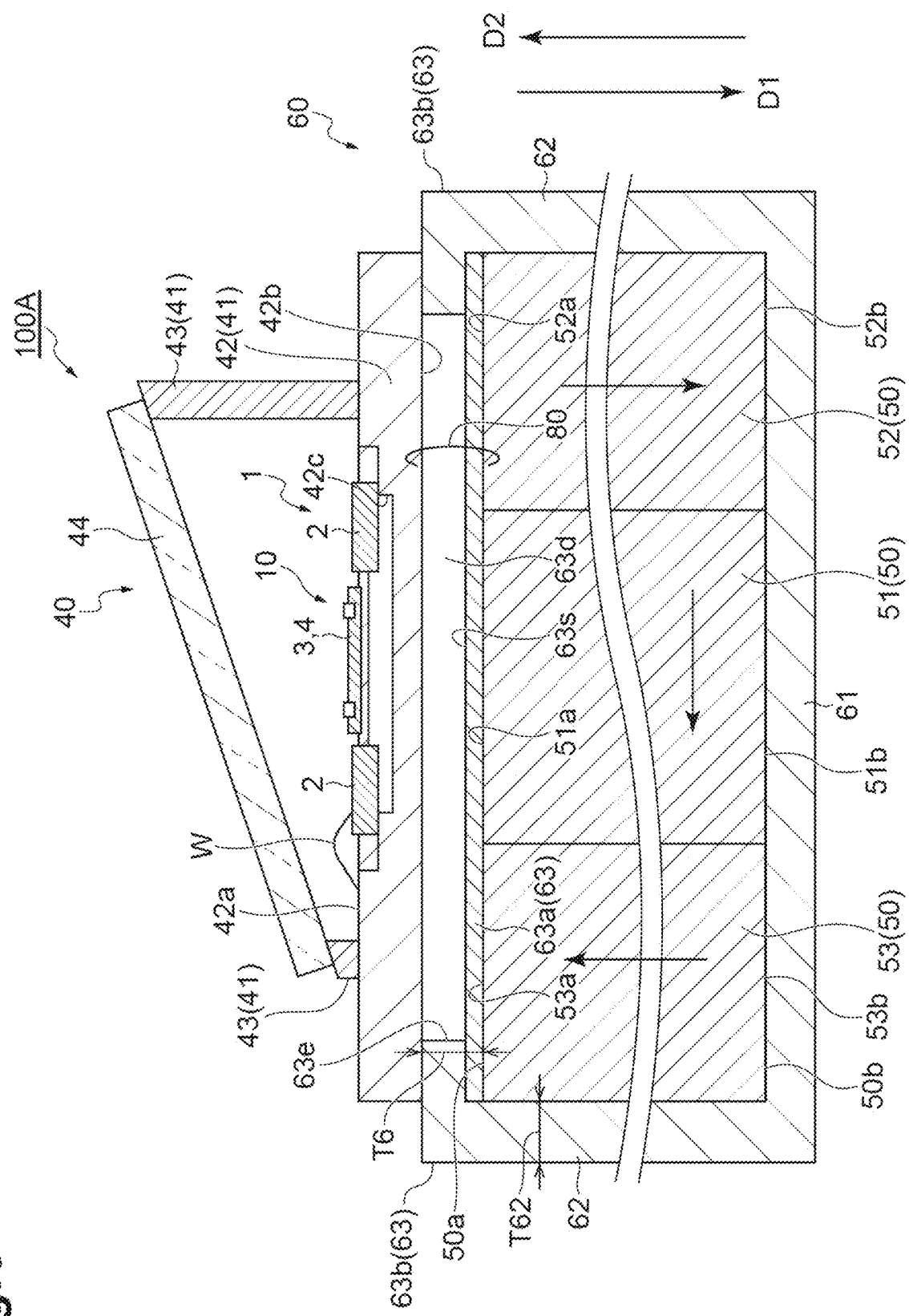
FIG. 6 is a cross-sectional view of an optical module according to the present embodiment.

Subsequently, a second embodiment of the present disclosure will be described. FIG. 6 is a cross-sectional view of an optical module according to the present embodiment. Compared to the optical module 100 illustrated in FIGS. 1 to 5, an optical module 100A illustrated in FIG. 6 differs from the optical module 100 in the structure of the restriction part 63 and the support structure for the mirror unit 40 and otherwise coincides with the optical module 100. In the optical module 100A, a part of the restriction part 63 is formed integrally with the bottom wall part 61 and the side wall part 62. This will be described more specifically.

As illustrated in FIG. 6, in the optical module 100A, the contact part 63a is formed separately from the bottom wall part 61 and the side wall part 62, and the lid part 63b is formed integrally with the side wall part 62. The lid part 63b is provided at the end part of the side wall part 62 on a side opposite to the bottom wall part 61. The lid part 63b continuously extends from the side wall part 62 such that it protrudes on the upper surface 50a from the side wall part 62. In other words, the lid part 63b extends such that it lies across the upper surface 50a of the magnet part 50 from the side wall part 62. Moreover, in other words, the lid part 63b extends toward the inward side of the upper surface 50a from the connection portion between the side surface 50s and the upper surface 50a of the magnet part 50. Accordingly, the lid part 63b has an inner edge 63e on the upper surface 50a. Compared to the contact part 63a of the optical module 100, the contact part 63a differs in having no support parts 63c. The contact part 63a is formed to have a flat plate shape.

Further, in the optical module 100A, the mirror unit 40 is placed on the lid part 63b and supported by the lid part 63b. That is, also in this case, the mirror unit 40 is supported by the package 60 (particularly, the restriction part 63 including the lid part 63b) on the upper surface 50a. Also in this case, the outward surface 42b of the base 42 of the mirror unit 40 faces the upper surface 50a side and comes into contact with the lid part 63b. In this manner, here, although the contact part 63a is formed separately from the side wall part 62 of the package 60, the contact part 63a is connected to the side wall part 62 (reaches the side wall part 62). For example, the base 42 is bonded to the lid part 63b using an adhesive resin or the like.

With such a support structure, the relaxation layer 80 constituted of a portion of the lid part 63b in which the mirror unit 40 is placed, the contact part 63a, and the air layer 63d corresponding to the height of the lid part 63b is interposed between the mirror unit 40 (the outward surface 42b) and the upper surface 50a of the magnet part 50. That is, also in the optical module 100A, the relaxation layer 80 for relaxing stress of the magnet part 50 is provided between the mirror unit 40 and the upper surface 50a. The air layer 63d is formed as a space defined by the inner edge 63e of the lid part 63b.

That is, also in this case, the relaxation layer 80 includes the contact part 63a and the air layer 63d formed on the upper surface 50a and the contact part 63a. A total thickness T6 of the thickness of the contact part 63a and the thickness of the lid part 63b in a direction intersecting (orthogonal to) the upper surface 50a is smaller than the thickness T62 of the side wall part 62 in a direction along the upper surface 50a. Accordingly, since the distance between the mirror unit 40 and the magnet part 50 is reduced, a magnetic field of the magnet part 50 can be efficiently utilized in the mirror unit 40. As a result, power consumption can be reduced.

Also in the optical module 100A described above, it is possible to exhibit effects similar to those of the optical module 100. Particularly, according to the optical module 100A, the structure of the contact part 63a and the support structure for the mirror unit 40 are simplified. In addition, when the optical module 100A is manufactured, the lid part 63b which is a part of the restriction part 63 can be formed integrally with the bottom wall part 61 and the side wall part 62 by insert molding of the magnet part 50 provided with the contact part 63a.

In the optical module 100A, the shape of the lid part 63b may be changed such that the lid part 63b is disposed on only the second magnets 52 and 53. In this case, the support structure for the mirror unit 40 is not interposed on the first magnet 51. In other words, the mirror unit 40 is supported by the package 60 (the lid part 63b) at a position not overlapping the first magnet 51 when viewed in a direction intersecting (orthogonal to) the upper surface 50a. In this case, even if thermal expansion occurs in the second magnets 52 and 53, the mirror unit 40 is unlikely to incline.

The embodiments described above are embodiments of the present disclosure. Therefore, the present disclosure is not limited to the optical modules 100 and 100A described above. In the present disclosure, the optical module 100 described above may be arbitrarily changed. Subsequently, modification examples will be described.

Figure 7:
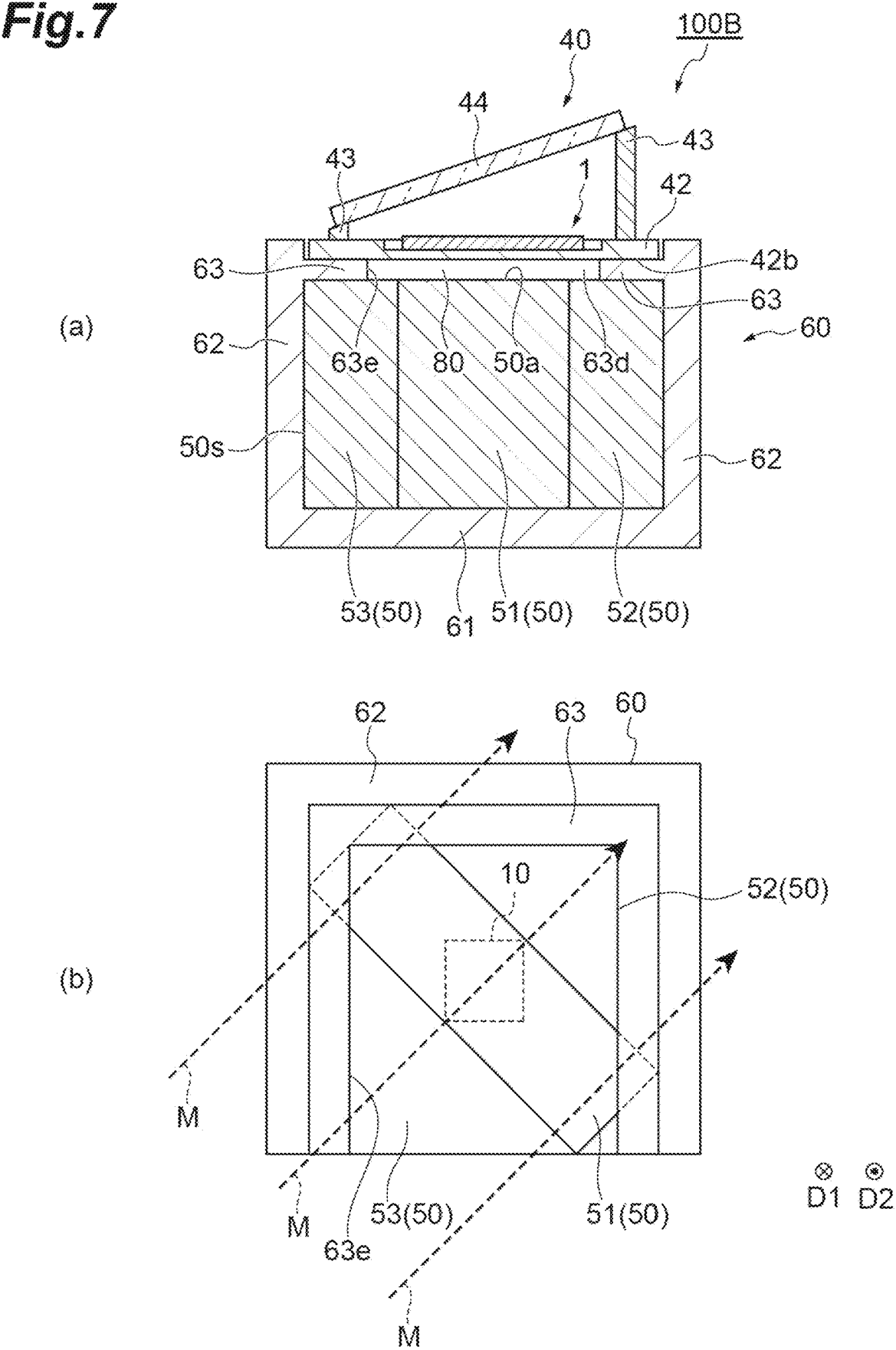
FIG. 7 is a view illustrating an optical module according to a first modification example.

FIG. 7 is a view illustrating an optical module according to a first modification example. FIG. 7(a) is a cross-sectional view, and FIG. 7(b) is a schematic plan view. Compared to the optical module 100A illustrated in FIG. 6, an optical module 100B illustrated in FIG. 7 differs from the optical module 100A in the structure of the restriction part 63 and the support structure for the mirror unit 40 and otherwise coincides with the optical module 100A.

In the optical module 100B, the restriction part 63 is constituted of a single portion, and its entirety is formed integrally with the bottom wall part 61 and the side wall part 62. More specifically, here, the restriction part 63 continuously extends from the side wall part 62 such that it protrudes from the side wall part 62 to the upper surface 50a side between the upper surface 50a of the magnet part 50 and the end part of the side wall part 62 on a side opposite to the bottom wall part 61. The restriction part 63 extends such that it lies across the upper surface 50a of the magnet part 50 from the side wall part 62. In other words, the restriction part 63 extends toward the inward side of the upper surface 50a from the connection portion between the side surface 50s and the upper surface 50a of the magnet part 50. The restriction part 63 does not extend throughout the entirety of the upper surface 50a and has the inner edge 63e on the upper surface 50a.

Further, in the optical module 100B, the mirror unit 40 is placed on the restriction part 63 and supported by the restriction part 63. That is, also in this case, the mirror unit 40 is supported by the package 60 (particularly, the restriction part 63) on the upper surface 50a. Also in this case, the outward surface 42b of the base 42 of the mirror unit 40 faces the upper surface 50a side and comes into contact with the restriction part 63. For example, the base 42 is bonded to the restriction part 63 using an adhesive resin or the like.

With such a support structure, the relaxation layer 80 constituted of a portion of the restriction part 63 in which the mirror unit 40 is placed and the air layer 63d corresponding to the height of the restriction part 63 is interposed between the mirror unit 40 (the outward surface 42b) and the upper surface 50a of the magnet part 50. That is, also in the optical module 100B, the relaxation layer 80 for relaxing stress of the magnet part 50 is provided between the mirror unit 40 and the upper surface 50a. The air layer 63d is formed as a space defined by the inner edge 63e of the restriction part 63.

Also in the optical module 100B described above, it is possible to exhibit effects similar to those of the optical module 100A. In addition, according to the optical module 100B, while movement of the magnet part 50 is restricted by the restriction part 63, transmission of stress from the magnet part 50 to the mirror unit 40 can be reliably curbed by the air layer 63d. Moreover, in the optical module 100B, since the restriction part 63 is constituted of a single portion, the structure of the package 60 and the support structure for the mirror unit 40 are simplified. In addition, when the optical module 100B is manufactured, the entirety of the restriction part 63 can be formed integrally with the bottom wall part 61 and the side wall part 62 by insert molding of the magnet part 50.

In the optical modules 100, 100A, and 100B described above, the magnet part 50 has a constitution in which a direction of a magnetic field M due to the magnet part 50 becomes oblique with respect to two swing axes (the first axis X1 and the second axis X2) of the movable mirror part 10.

Figure 8:
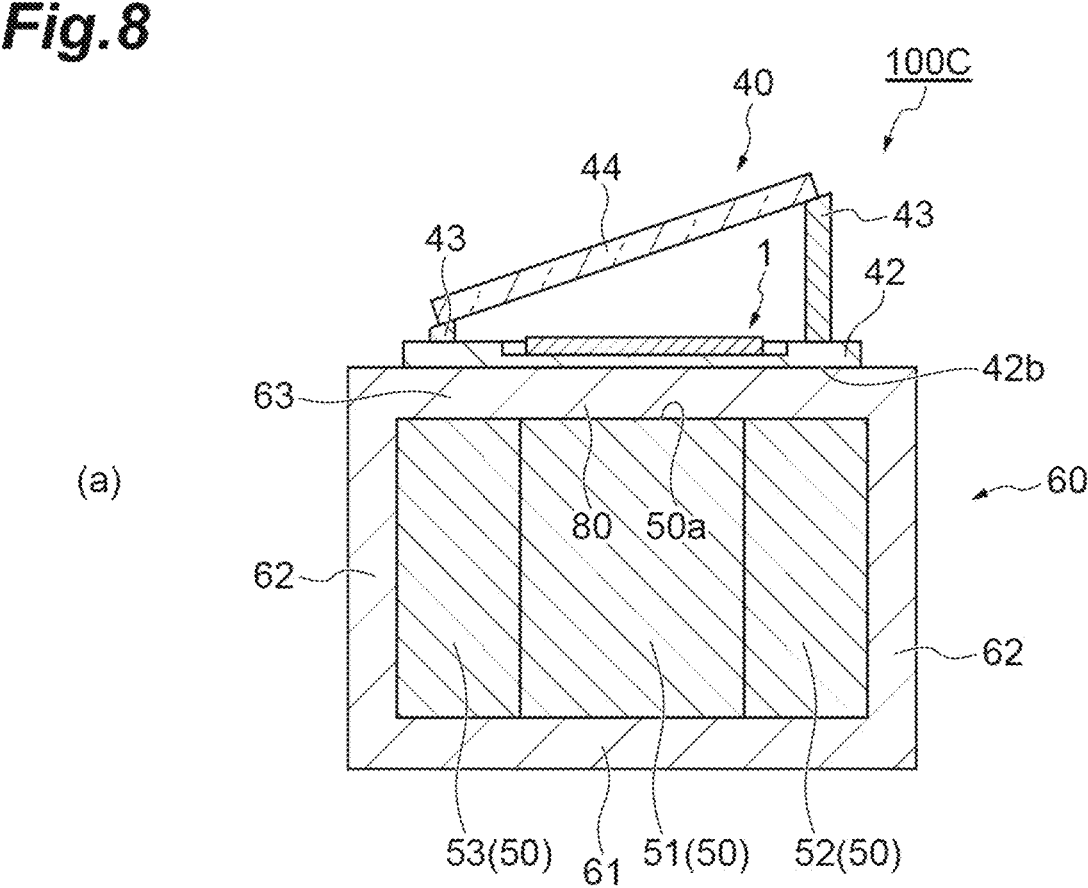
FIG. 8 is a view illustrating an optical module according to a second modification example.
Figure 8:
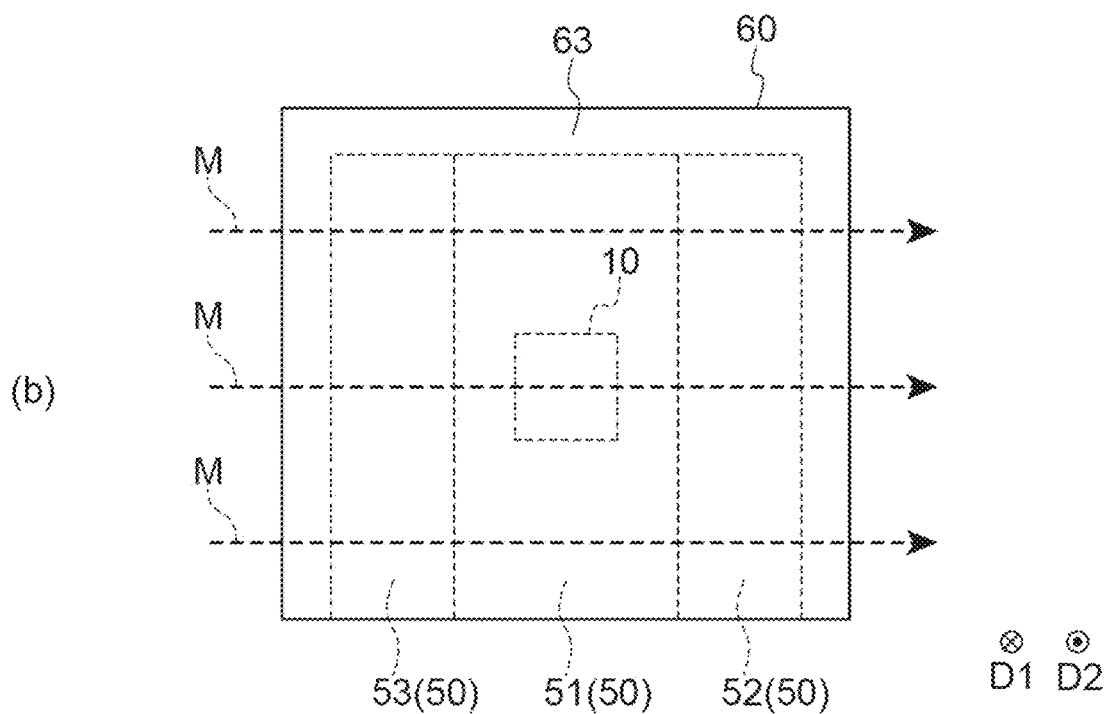

FIG. 8 is a view illustrating an optical module according to a second modification example. FIG. 8(a) is a cross-sectional view, and FIG. 8(b) is a schematic plan view. Compared to the optical module 100B illustrated in FIG. 7, an optical module 100C illustrated in FIG. 8 differs from the optical module 100B in the constitution of the structure of the restriction part 63, the support structure for the mirror unit 40, and the magnet part 50 and otherwise coincides with the optical module 100A.

Also in the optical module 100C, similar to the optical module 100B, the restriction part 63 is constituted of a single portion and formed integrally with the bottom wall part 61 and the side wall part 62. However, here, the restriction part 63 (here, also serving as a contact part) extends such that the entirety of the upper surface 50a from the end part of the side wall part 62 on a side opposite to the bottom wall part 61 is covered. Namely, here, the magnet part 50 is covered with the package 60 constituted of the bottom wall part 61, the side wall part 62, and the restriction part 63.

Further, in the optical module 100C, the mirror unit 40 is placed on the restriction part 63 and supported by the restriction part 63. Also in this case, the mirror unit 40 is supported by the package 60 (particularly, the restriction part 63) on the upper surface 50a. Also in this case, the outward surface 42b of the base 42 of the mirror unit 40 faces the upper surface 50a side and comes into contact with the restriction part 63. For example, the base 42 is bonded to the restriction part 63 using an adhesive resin or the like.

In the optical module 100C, the restriction part 63 fills a space between the mirror unit 40 and the upper surface 50a. That is, here, the entirety of the relaxation layer 80 interposed between the mirror unit 40 and the upper surface 50a is constituted of the restriction part 63. When a thickness of the restriction part 63 is smaller than a width of the side wall part 62, a magnetic force of the magnet part 50 can be more efficiently utilized, and thus power consumption can be reduced. The thickness of the restriction part 63 indicates a distance between a bottom surface facing the magnet part 50 and a top surface facing a side opposite to the magnet part 50 in the restriction part 63. In addition, the width of the side wall part 62 (thickness T62) indicates a distance between an inner surface facing the magnet part 50 and an outer surface facing a side opposite to the magnet part 50 in the side wall part 62.

Also in the optical module 100C described above, it is possible to exhibit effects similar to those of the optical module 100B. Particularly, according to the optical module 100C, the restriction part 63 and the entirety of the relaxation layer 80 can be shared with each other. As illustrated in FIG. 8(b), in the optical module 100C, when the movable mirror part 10 has only the first axis X1 or the second axis X2 as a swing axis, the magnet part 50 has a constitution in which the direction of the magnetic field M due to the magnet part 50 becomes orthogonal to the swing axis. However, also in the optical module 100C, similar to the optical module 100B, a constitution of the magnet part 50 in which the direction of the magnetic field M due to the magnet part 50 becomes oblique with respect to the two swing axes (the first axis X1 and the second axis X2) of the movable mirror part 10 may be employed.

Figure 9:
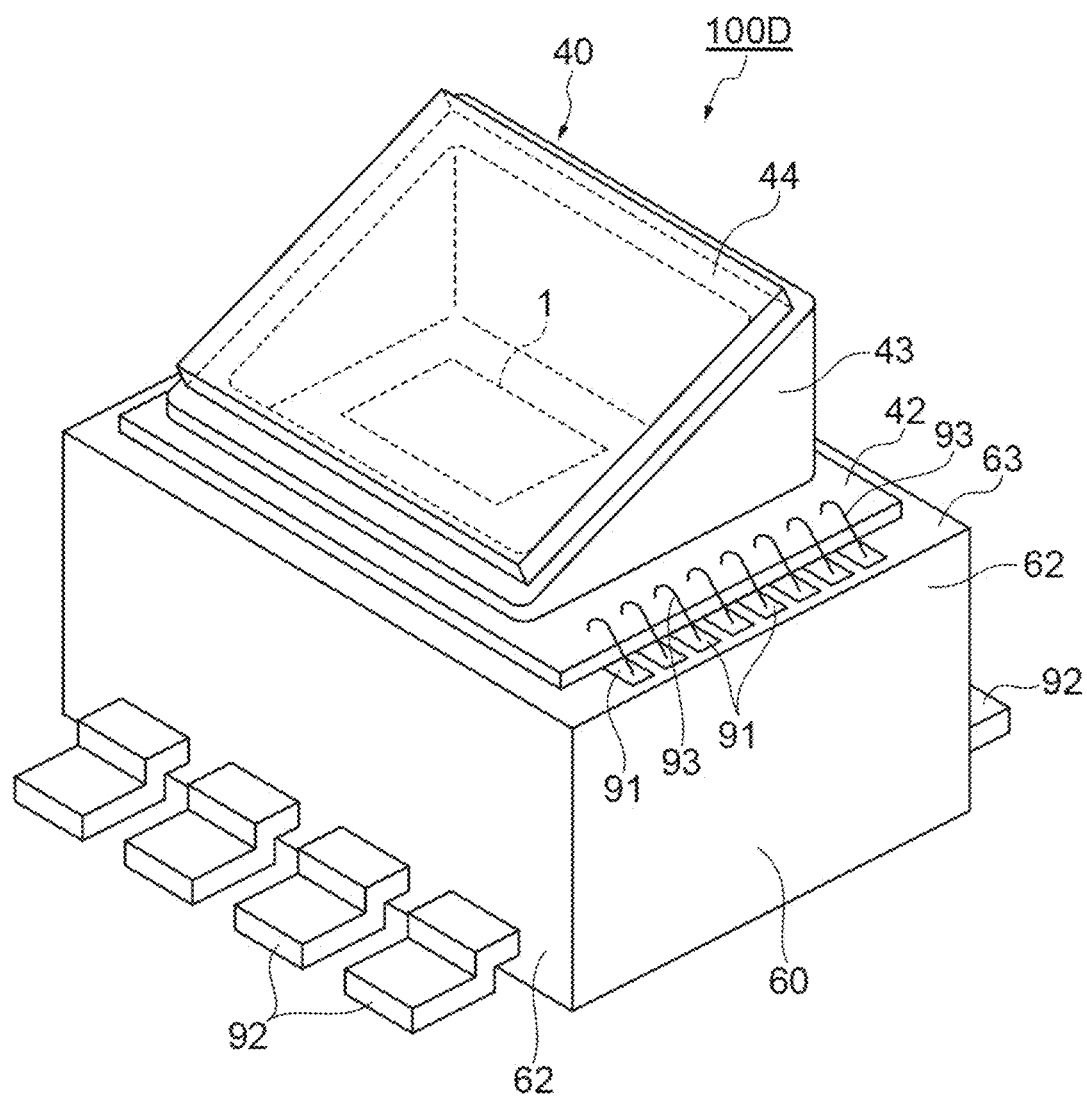
FIG. 9 is a perspective view illustrating an optical module according to a third modification example.

FIG. 9 is a perspective view illustrating an optical module according to a third modification example. In an optical module 100D illustrated in FIG. 9, a lead frame for electrical connection of the MEMS mirror 1 is formed integrally with the package 60 by insert molding. Here, a plurality of first leads 91 are buried inside one side wall part 62, and an apex part of the first leads 91 is exposed to an outer surface of the restriction part 63, thereby forming a pad part. In addition, a second lead 92 electrically connected to the first leads 91 projects from a side surface of a pair of side wall parts 62 facing each other (here, a side wall part 62 different from the side wall part 62 in which the first leads 91 is formed) on the bottom wall part 61 side. Since a wire 93 provided in the base 42 is connected to the first leads 91, the MEMS mirror 1 may be electrically connected to the outside via the first leads 91 and the second lead 92. The second lead 92 may project in the bottom wall part 61 of the package 60.

Figure 10:
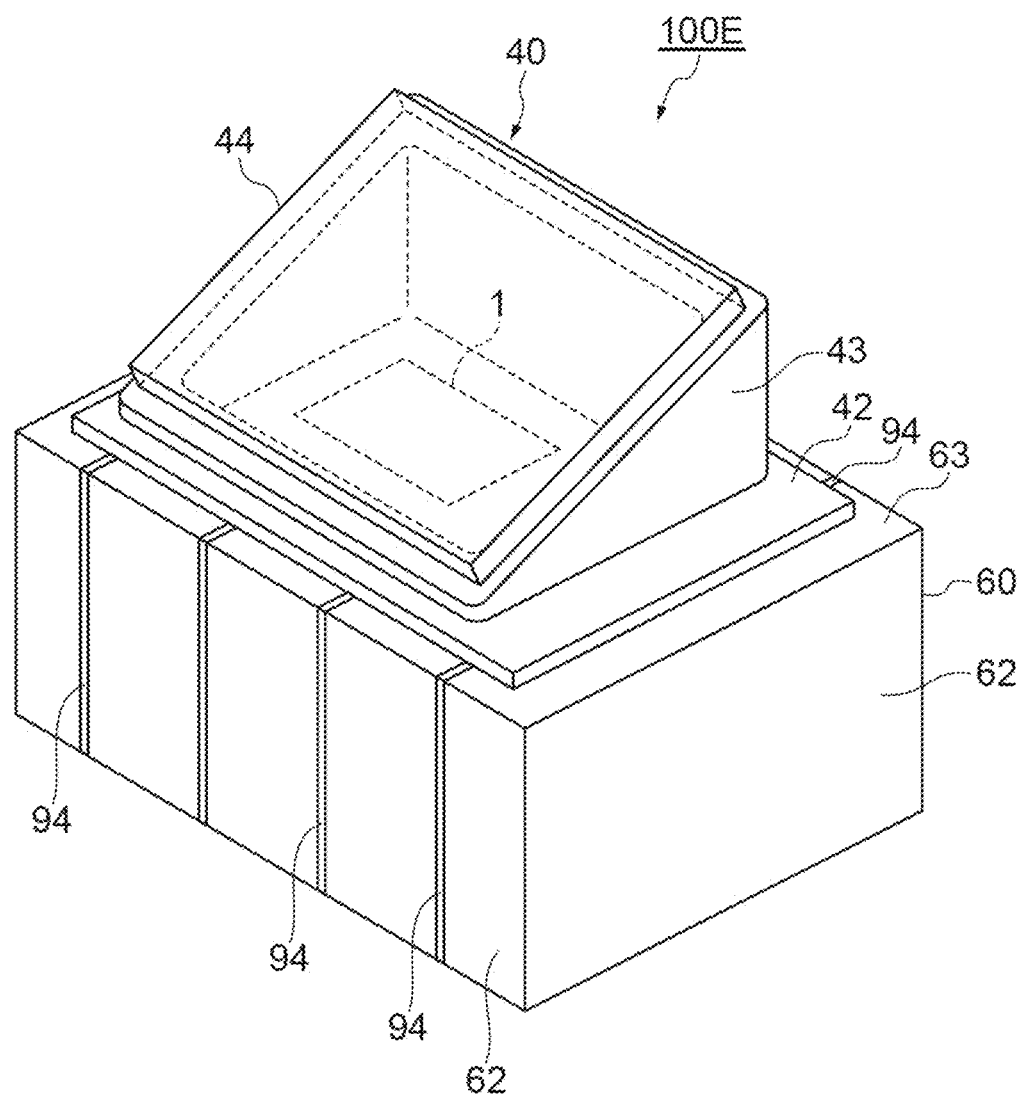
FIG. 10 is a perspective view illustrating an optical module according to a fourth modification example.

FIG. 10 is a perspective view illustrating an optical module according to a fourth modification example. In an optical module 100E illustrated in FIG. 10, a wiring pattern for electrical connection of the MEMS mirror 1 is formed on an outer surface of the package 60. Here, a wiring 94 extending from an outer surface of the pair of side wall parts 62 facing each other to the outer surface of the restriction part 63 (the surface on the mirror unit 40 side) is formed. A pad part is provided at a terminal of the wiring 94 on the outer surface of the restriction part 63. On the other hand, a pad part is provided at a position corresponding to the pad part on the wiring 94 side on the outward surface 42b of the base 42. The pad part on the outward surface 42b of the base 42 and the pad part on the outer surface of the restriction part 63 are electrically connected to each other by solder connection or the like, for example. The pad part on the outward surface 42b of the base 42 is electrically connected to the MEMS mirror 1 by wire bonding using an internal wiring provided inside the base 42 and the wire W. Accordingly, electrical connection via the wiring 94 of the MEMS mirror 1 may be performed.

Figure 11:
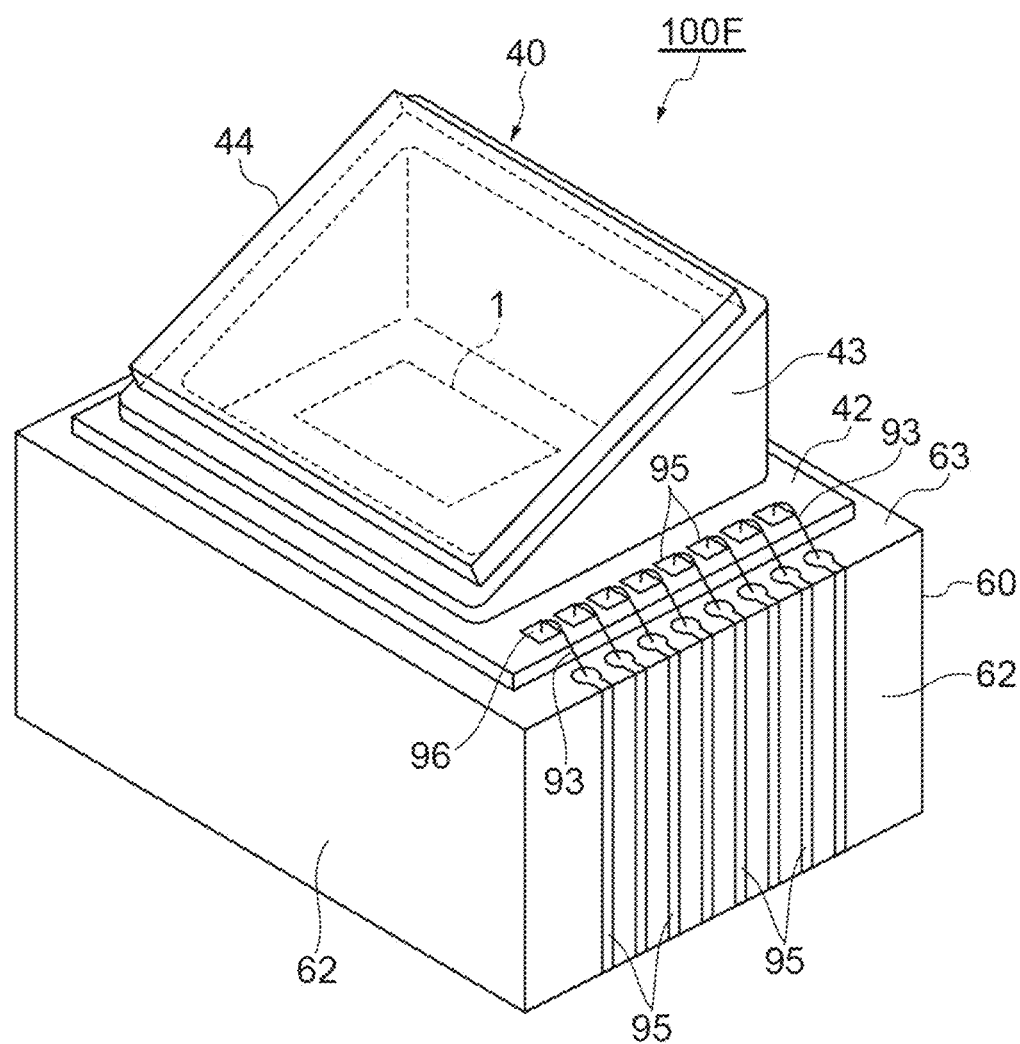
FIG. 11 is a perspective view illustrating an optical module according to a fifth modification example.

FIG. 11 is a perspective view illustrating an optical module according to a fifth modification example. In an optical module 100F illustrated in FIG. 11, a wiring 95 extending from an outer surface of one side wall part 62 of the package 60 to an end part on the outer surface of the restriction part 63 (a surface on the mirror unit 40 side) is formed. A portion on the restriction part 63 of the wiring 95 serves as a pad part, and electrical connection via the wiring 95 of the MEMS mirror 1 may be performed by connecting the pad part and another pad part 96 provided in the base 42 to each other using the wire 93.

Moreover, among the optical modules 100 to 100F, the structure of each unit may be mutually changed and applied. More specifically, in the optical modules 100 to 100C, as in the optical modules 100D to 100F, a structure of electrical connection of the MEMS mirror 1 may be employed. Alternatively, in the optical module 100 to 100B, as in the optical module 100C, when the movable mirror part 10 has only the first axis X1 or the second axis X2 as a swing axis, a constitution of the magnet part 50 in which the direction of the magnetic field M due to the magnet part 50 becomes orthogonal to the swing axis may be employed.

In addition, the optical module is not limited to a form in which the restriction part 63 supports the mirror unit 40 as in the optical modules 100 to 100F described above. For example, a form in which the mirror unit 40 is supported by a projection part or the like provided in the side wall part 62 at a position not overlapping the magnet part 50 when viewed in a direction intersecting the upper surface 50a may be adopted. That is, regarding the optical module, the mirror unit 40 need only be supported by the package 60 serving as a holding member while the relaxation layer 80 is formed between the upper surface 50a and the mirror unit 40.

Moreover, when a ceramic substrate or the like for loading (mounting) a chip including a movable mirror part is not provided, only a chip including a movable mirror part becomes a mirror unit. That is, for example, when the base 42 (a ceramic substrate or the like) is not provided, only the MEMS mirror 1 (a chip including a movable mirror) serves as a mirror unit. In this case, the support part 2 of the MEMS mirror 1 is supported by the package 60 on the upper surface 50a, and the relaxation layer 80 is formed between the MEMS mirror 1 and the upper surface 50a.

More specifically, in this case, in the foregoing first embodiment (for example, FIG. 1), the MEMS mirror 1 is placed in and supported by the support parts 63c of the contact part 63a of the package 60. In addition, in this case, in the second embodiment (for example, FIG. 6), the MEMS mirror 1 is placed in and supported by the lid part 63b of the package 60. In addition, in this case, in the examples illustrated in FIGS. 7 and 8, the MEMS mirror 1 is placed in and supported by the restriction part 63 of the package 60. Moreover, in this case, the MEMS mirror 1 may be placed in and supported by a projection part or the like provided in the side wall part 62 at a position not overlapping the magnet part 50 when viewed in a direction intersecting the upper surface 50a.

In addition, when the mirror unit is only a chip including a movable mirror part, in the example illustrated in FIG. 9, electrical connection of the MEMS mirror 1 can be performed by connecting the wire W to the pad parts of the first leads 91 directly from the MEMS mirror 1. In addition, in the example illustrated in FIG. 10, electrical connection of the MEMS mirror 1 can be performed by providing a pad part on a rear surface of the MEMS mirror 1 and connecting the pad part to a pad part of the wiring 94 using a bump. Moreover, in the example illustrated in FIG. 11, electrical connection of the MEMS mirror 1 can be performed by connecting the wire W to a pad part of the wiring 95 directly from the MEMS mirror 1.

On the other hand, when a chip including a movable mirror part is loaded (mounted) on a ceramic substrate or the like, the mirror unit includes a ceramic substrate or the like in addition to a chip including a movable mirror part. For example, when the MEMS mirror 1 (a chip including a movable mirror) is loaded (mounted) in the base 42 (a ceramic substrate or the like), the mirror unit also includes the base 42. This case is as described in the foregoing embodiment. A ceramic substrate or the like on which a chip including a movable mirror is loaded (mounted) is supported by a holding member by being placed in the holding member. That is, in contrast to the holding member integrally holding a magnet part, a ceramic substrate or the like in this case does not contribute to integral holding of the magnet part.

This case is as described in the foregoing embodiment. In addition, here, being loaded (mounted) denotes that a chip including a movable mirror is connected to a ceramic substrate or the like electrically and/or mechanical, and/or in terms of a structure, and a case in which a chip including a movable mirror is only placed on a ceramic substrate or the like is excluded. When a chip including a movable mirror is electrically connected to a ceramic substrate or the like, the ceramic substrate or the like may function as a wiring substrate. In addition to a ceramic substrate, a ceramic substrate or the like may be a substrate formed of glass epoxy.

Moreover, when a mirror unit is directly bonded to an upper surface of a magnet part using an adhesive, an adhesive interposed between the mirror unit and the magnet part does not function as a relaxation layer.

INDUSTRIAL APPLICABILITY

An optical module capable of curbing inclination of a mirror unit is provided.

REFERENCE SIGNS LIST

10 Movable mirror part
11 First drive coil (coil)
12 Second drive coil (coil)
40 Mirror unit
50 Magnet part
50a Upper surface
50b Bottom surface
50s Side surface
51 First magnet
52, 53 Second magnet
60 Package (holding member)
63 Restriction part
63d Air layer
63e Timer edge
80 Relaxation layer
100 to 100F Optical module

The invention claimed is:

1. An optical module comprising:
a mirror unit having a movable mirror part including a coil;
a magnet part having upper and bottom surfaces and a side surface extending from the upper surface to the bottom surface and configured to generate a magnetic field acting on the movable mirror part; and
a holding member configured to hold the magnet part,
wherein the magnet part has a Halbach structure including a first magnet applied with a force in a first direction toward the bottom surface from the upper surface and a second magnet applied with a force in a second direction toward the upper surface from the bottom surface,
wherein the holding member integrally holds the magnet part against a force acting on the first magnet in the first direction and a force acting on the second magnet in the second direction,
wherein the holding member has a restriction part supporting the upper surface of the magnet part, a bottom wall part supporting the bottom surface of the magnet part, and a side wall part supporting the side surface of the magnet part and connecting the restriction part and the bottom wall part,
wherein the mirror unit is supported on the upper surface by the holding member, and
wherein a relaxation layer for relaxing stress from the magnet part is provided between the upper surface and the mirror unit.

2. The optical module according to claim 1,
wherein the restriction part is positioned to restrict movement of the magnet part in the second direction, and
wherein the mirror unit is supported by the restriction part.

3. The optical module according to claim 2,
wherein the restriction part constitutes at least a part of the relaxation layer.

4. The optical module according to claim 3,
wherein the restriction part fills a space between the upper surface and the mirror unit and constitutes an entirety of the relaxation layer.

5. The optical module according to claim 3,
wherein the restriction part extends from a connection portion between the upper surface and the side surface toward an inward side of the upper surface and has an inner edge on the upper surface, and
wherein the relaxation layer is constituted of the restriction part and an air layer formed in a space defined by the inner edge.

6. The optical module according to claim 2,
wherein the holding member has a side wall part supporting the side surface, and
wherein the restriction part is formed integrally with the side wall part.

7. The optical module according to claim 2,
wherein the holding member has a side wall part supporting the side surface,
wherein the restriction part is provided on the upper surface such that the upper surface is covered when viewed in a direction intersecting the upper surface and has a contact part coming into contact with the upper surface, and
wherein the contact part is connected to the side wall part.

8. The optical module according to claim 7,
wherein a thickness of the contact part in a direction intersecting the upper surface is smaller than a thickness of the side wall part in a direction along the upper surface.

9. The optical module according to claim 7,
wherein the relaxation layer includes the contact part and an air layer formed on the upper surface and the contact part.

10. The optical module according to claim 1,
wherein the mirror unit is supported by the holding member at a position not overlapping the first magnet when viewed in a direction intersecting the upper surface.

11. The optical module according to claim 1,
wherein the relaxation layer includes a portion having a Young's modulus lower than a Young's modulus of the magnet part.

12. The optical module according to claim 1,
wherein the relaxation layer is configured to form a space between the upper surface of the magnet part and the mirror unit.

13. The optical module according to claim 12,
wherein the relaxation layer has a first surface that faces the magnet part and a second surface opposite the first surface, that is spaced away from the mirror unit.

14. The optical module according to claim 13,
wherein the relaxation layer includes a support part protruding from the second surface toward the mirror unit, and
wherein the mirror unit contacts the support part.

15. The optical module according to claim 12, further comprising a pair of restriction parts that contact the mirror unit, wherein the space is formed between the pair of restriction parts.

16. The optical module according to claim 1, wherein the mirror unit is disposed on a part of the restriction part.

* * * * *